United States Patent Office 3,455,968
Patented July 15, 1969

3,455,968
9α-HALOGENO-11β-AZIDO-STEROIDS AND METHODS FOR THEIR MANUFACTURE
Hershel L. Herzog, Glen Ridge, and Elliot L. Shapiro, Cedar Grove, N.J., assignors to Schering Corporation, Bloomfield, N.J., a corporation of New Jersey
No Drawing. Filed May 15, 1967, Ser. No. 638,606
Int. Cl. C07c *169/22, 169/34;* A61k *17/06*
U.S. Cl. 260—349
15 Claims

ABSTRACT OF THE DISCLOSURE

Novel 3-oxygenated-9α-halogeno-11β-azido steroids of the androstane and pregnane series and 19-nor analogs thereof, having valuable pharmacological properties, are prepared via reaction of a 3 - oxygenated-9(11)-dehydro steroid with an alkali metal azide and a positive halogen source.

The 9α-halogeno-11β-azido steroids are also prepared via reaction of a 9α-halogeno-11β-tosyloxy steroid with a saturated aqueous methanol solution of an alkali metal azide.

Described specifically are the 9α-chloro- and the 9α-bromo-11β-azido-derivatives of steroids of the androstane, pregnane series and 19-nor analogs thereof.

Field of the invention

This invention relates to novel compositions of matter classified in the art of chemistry as 9α-halogeno-11β-azido-steroids and to process for their preparation.

Summary of the invention

The invention sought to be patented in its composition-of-matter aspect resides in the concept of a 9α-halogeno-(preferably 9α-chloro- and 9α-bromo-)-11β-azido-steroid (preferably of the androstane and pregnane series and the 19-nor analogs thereof), said 9α-halogeno-11β-azido-steroid being further characterized by having an oxygen function (preferably keto) at C–3, and by having a substituent at C–17 selected from the group consisting of oxygen, $$\diagdown_{---A}^{OR}$$

and $$\diagdown_{---T}^{COCH_2V}$$

A being a member selected from the group consisting of hydrogen, lower alkyl, lower alkenyl, and lower alkinyl; R being a member selected from the group consisting of hydrogen and lower alkanoyl; T being a member selected from the group consisting of hydrogen, hydroxy, and lower alkanoyloxy, and V being a member selected from the group consisting of fluorine, hydrogen, hydroxy, lower alkanoyloxy, lower alkoxycarboxy, and dihydroxyphosphoryloxy.

The physical embodiments of the composition-of-matter aspect of this invention may have saturated A and B rings or may possess one or more nuclear unsaturations such as at C–1, C–4, C–5, C–6 and at C–16, and may be further substituted such as at C–2 and/or at C–7 by lower alkyl (preferably methyl), at C–6 by a member selected from the group consisting of lower alkyl (preferably methyl) and halogeno (preferably chloro and fluoro), at C–15 by a member selected from the group consisting of halogeno (preferably chloro), hydroxy and lower alkanoyloxy, and at C–16 by a member selected from the group consisting of lower alkyl (preferably alpha methyl and beta methyl), lower alkylidene (preferably methyl-ene), hydroxy, lower alkanoyloxy, and halogeno (preferably chloro).

The 9α-halogeno-11β-azido-pregnanes of this invention which also possess at least one hydroxyl group at the 17α- and the 21-positions possess cortical activity. In addition, some of these compounds, e.g. the 9α-halogeno-11β-azido-4 - pregnene - 17α,21-diol-3,20-diones and the 1-dehydro analogs thereof and the 9α-halogeno-11β-azido-17α-hydroxy - 21 - fluoroprogesterones possess anti-inflammatory activity and are used in a similar manner as known corticoids such as cortisone and hydrocortisone.

The 9α - halogeno - 11β-azido-17α-alkyl-17β-hydroxy-androstanes of our invention are anabolic/androgenic agents.

The 9α-halogeno-11β-azido-17-keto-androstanes, the 9α-halogeno - 11β-azido-17α-alkanoyloxy-progesterones and the 17α - alkenyl- and the 17α - alkinyl-9α-halogeno-11β-azido-testosterone derivatives of this invention possess anti-androgenic and progestational activity and exhibit anticonception properties.

The invention sought to be patented in its process aspect resides in the concept of treating a 9(11)-dehydrosteroid (preferably of the androstane and pregnane series and the 19-nor-analogs thereof) with an alkali metal azide (preferably sodium azide) and a positive halogen source (preferably N-chlorosuccinimide or N-bromoacetamide in the presence of acid) whereby is obtained a physical embodiment of a 9α-halogeno-11β-azido steroid of the composition-of-matter aspect of this invention.

GENERAL DESCRIPTION OF THE INVENTION

Composition of matter aspect

Included among the preferred physical embodiments of the composition-of-matter aspect of this invention as defined hereinabove are compounds selected from the group consisting of 9α-halogeno-11β-azido-steroids of the androstane and pregnane series and the 19-nor analogs thereof having minimally the following structural Formula I, and the 4,5-dihydro-, 1-dehydro-, 6-dehydro-, and the 1-6-bis-dehydro-analogs thereof,

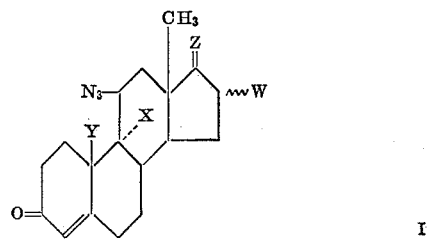

I wherein X is a halogen having an atomic weight greater than 20 and less than 100; Y is a member selected from the group consisting of hydrogen and lower alkyl; W is a member selected from the group consisting of hydrogen, lower alkyl (preferably α-methyl and β-methyl), lower alkylidene (preferably methylene), hydroxy and lower alkanoyloxy; and Z is a member selected from the group consisting of oxygen, $$\diagdown_{---A,}^{OR} \text{ and } \diagdown_{---T}^{COCH_2V}$$

A being a member selected from the group consisting of hydrogen, lower alkyl, lower alkenyl, and lower alkinyl, R being a member selected from the group consisting of hydrogen and lower alkanoyl, T being a member selected from the group consisting of hydrogen, hydroxy, and lower alkanoyloxy, and V being a member selected from the group consisting of hydrogen, fluoro, iodo, hydroxy, lower alkanoyloxy, lower alkoxycarboxy, and dihydroxyphosphoryloxy.

The physical embodiments of the composition aspect of this invention are not to be construed as limited to the compounds specifically defined by the above minimal formula. Also included within the inventive concept are derivatives thereof such as compounds of Formula I having also one or more substituents at C-2 (e.g. α-methyl); C-6 (e.g. 6(α and β)-chloro), 6(α and β)-fluoro), 6(α and β)-methyl; C-7 (e.g. 7α-methyl) at C-15 (e.g. 15α-chloro) and the like.

By "lower alkyl" are contemplated hydrocarbon radicals having up to four carbon atoms including methyl, ethyl, n-propyl, iso-propyl, n-butyl, iso-butyl, tert.-butyl.

By lower alkylidene are contemplated exocyclic unsaturated hydrocarbon radicals having up to four carbon atoms including methylene, ethylidene, propylidene, and n-butylidene.

By lower alkanoyl are contemplated saturated hydrocarbon carboxylic acid residues having up to 12 carbon atoms including acetyl, propionyl, valeryl, n-butyryl, caproyl and the like.

Included among the compounds of this invention as defined by Formula I are 9α - halogeno - 11β-azido corticoids (i.e. pregnanes wherein Z is

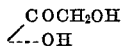

and the lower alkanoate esters thereof) such as

9α - chloro - 11β - azido-16α-methyl-1,4-pregnadiene-17α,21 - diol-3,20-dione and the 17-valerate, 17,21-bispropionate, 21-phosphate, 21-acetate, 21-valerate, 21-carboethoxylate esters thereof, 9α - bromo - 11β - azido-16α-methyl-1,4-pregnadiene-17α,21-diol-3,20-dione and the 21-phosphate and 21-acetate esters thereof, 9α - chloro-11β-azido-1,4-pregnadiene-17α,21-diol-3,20-dione and the 21-acetate ester thereof, 9α - chloro - 11β - azido-16β-methyl-1,4-pregnadiene-17α,21-diol-3,20-dione and the 17-valerate, 17,21-dipropionate, 21-phosphate and 21-acetate esters thereof, 6α - methyl - 9α - chloro-11β-azido-1,4-pregnadiene-17α,21-diol-3,20-dione, the 21-phosphate and 21-acetate esters thereof, 6,9α - dichloro - 11β - azido-4,6-pregnadiene-17α,21-diol-3,20-dione, the 21-phosphate and 21-acetate esters and the 1-dehydro analogs thereof.

The 9α-halogeno (e.g. 9α-chloro and 9α-bromo)-11β-azido-pregnanes of our invention (in particular the 3-keto-1,4-bisdehydro compounds of Formula I wherein Z is

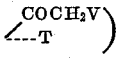

which also possess at least one hydroxyl group at the 17α- and 21-positions (i.e. T and/or V is hydroxy) possess cortical activity. In addition, some of the foregoing class of compounds, including the 9α - halogeno-11β-azido corticoids such as listed above and the 9α-halogeno-11β-azido - 17α-hydroxy-21-fluoro-progesterones (i.e. 4-pregnenes wherein Z is

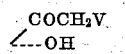

V being fluoro) exhibit anti-inflammatory activity and are used in the same manner as known corticoids such as cortisone and hydrocortisone.

Thus, for example, 9α-chloro-11β-azido-16α-methyl-1,4-pregnadiene-17α,21-diol-3,20-dione 21-acetate, when tested in female rats via the intracutaneous route in the standard Granuloma Pouch test utilizing prednisolone acetate as the standard, exhibited anti-inflammatory activity at doses in the range of from 100 micrograms to 900 micrograms.

The pharmaceutically active 3-keto-1,4-bis-dehydro-9α-halogeno-11β-azido corticoids of our invention have an activity similar to the corresponding 3-keto-4-dehydro- and 3 - keto - 1,4-bis-dehydro-9α-halogeno-11β-hydroxy corticoids and may be administered in similar pharmaceutical forms and for the same indications for which the 3-keto-9α-halogeno-11β-hydroxy-4-pregnenes and 1,4-pregnadienes would be applicable. For example, 9α-chloro- 11β - azido-16α-methyl-1,4-pregnadiene-17α,21-diol-3,20-dione and esters thereof, e.g. the 21-acetate, possess antiinflammatory activity similar to hydrocortisone and may be administered intracutaneously or intramuscularly as the 21-acetate in an aqueous suspension, orally in the form of tablets or capsules, or topically as a cream to which may be added other active ingredients such as neomycin sulfate, or in the form of opthalmic suspensions or as nasal sprays. In each instance the pharmaceutical preparations are prepared according to procedures well known in the art.

Typical 9α-halogeno-11β-azido-progesterone derivatives of this invention (i.e. compounds of Formula I wherein Z is

include

9α-chloro-11β-azidoprogesterone,
9α-bromo-11β-azidoprogesterone,
9α-chloro-11β-azido-17α-acetoxyprogesterone,
9α-bromo-11β-azido-17α-acetoxyprogesterone,
9α-chloro-11β-azido-16-methylene-17α-acetoxyprogesterone,
6,9α-dichloro-11β-azido-16-methylene-17α-acetoxy-6-dehydro-progesterone, and
6α-fluoro-9α-bromo-11β-azido-progesterone.

Included among the 9α-halogeno-11β-azido-androstanes of Formula I (i.e. compounds of Formula I wherein Z is oxygen, and

are such as:

9α-chloro-11β-azido-4-androsten-17β-ol-3-one,
9α-chloro-11β-azido-4-androsten-3,17-dione,
9α-bromo-11β-azido-4-androsten-17β-ol-3-one,
9α-bromo-11β-azido-4-androsten-3,17-dione,
9α-chloro-11β-azido-17α-methyl-4-androsten-17β-ol-3-one,
9α-chloro-11β-azido-17α-ethyl-4-androsten-17β-ol-3-one,
9α-chloro-11β-azido-17α-vinyl-4-androsten-17β-ol-3-one,
9α-chloro-11β-azido-17α-ethinyl-4-androsten-17β-ol-3-one and the corresponding 9α-bromo derivatives.

The 9α-halogeno - 11β - azido-17α-lower alkyl-17β-hydroxy-androstanes of Formula I, e.g. 9α-chloro-11β-azido-17α-methyl-4-androstene-17β-ol-3-one and 9α-bromo-11β-azido-17α-methyl-4-androstene-17β-ol-3-one are anabolic agents having a favorable anabolic/androgenic ratio and may be used in place of anabolic/androgenic agents used in known pharmaceutical preparations, the dose administered varying with the nature and severity of the patient's symptoms being treated.

The 9α-halogeno-11β-azido-17-keto-androstanes (e.g. 9α-chloro-11β-azido-4-androsten-3,17-dione) the 9α-halogeno-11β-azido-17α-alkenyl-17β-hydroxy-androstanes and the 9α - halogeno-11β-azido-17α-alkinyl-17β-hydroxy-androstanes (e.g. 9α-chloro-11β-azido-17α-vinyl-4-androsten-17β-ol-3-one and 9α-chloro-11β-azido-17α-ethinyl-4-androsten-17β-ol-3-one) and the 9α-halogeno-11β-azido-17α-alkanoyloxy-progesterones (e.g. 9α-chloro-11β-azido-17α-acetoxy-progesterone and 6,9α-dichloro-11β-azido-16-methylene-17α-acetoxy-4,6-pregnadiene-3,20-dione) possess to some extent anti-androgenic and progestational activity and exhibit anti-conceptional properties.

Those compounds wherein Z represents

(the alkinyl being ethinyl, propinyl, halogenoethinyl, trifluoromethylethinyl) e.g. 9α-chloro-11β-azido-17α-ethinyl-4-androsten-17β-ol-3-one, demonstrate anti-conception properties. They are also anti-androgenic agents as evidenced by their anti-gonadal hormonal properties such as demonstrated by their ability to depress secondary sex structures in both male and female animals, this making them useful for the treatment of prostatic hypertrophy in dogs. Also of particular use as anti-androgenic agents are the 6-chloro-9α-halogeno-11β-azido-6-dehydro-progesterones, in particular 6,9α-dichloro-11β-azido-16-methylene-17α-acetoxy-6-dehydro-progesterone.

The 9α - halogeno-11β-azido-17α-alkenyl-17β-hydroxyandrostanes, e.g. 9α-chloro-11β-azido-17α-vinyl-4-androsten-17β-ol-3-one are to some extent progestational making them of use, for example, in delaying the onset of heat in dogs and cats.

The 9α-halogeno-11β-azido-17α-alkanoyloxy-progesterones, in particular 9α-chloro-11β-azido-17α-acetoxy-progesterone and the 16-methylene- and the 6α-chloro-16-methylene derivatives thereof, exhibit progestational activity and are used in similar manner and for the same disorders as known progestins, e.g. progesterone, ethisterone, and the like.

In general, the pharmaceutical formulations of our 9α-halogeno-11β-azido-steroids are prepared and are administered utilizing procedures known in the art. For example, the physiologically active compounds of this invention, such as described above, may be administered orally or parenterally, by incorporating a therapeutic dosage in conventional pharmaceutical form such as tablets, capsules, elixirs, suspensions, solutions, or the like. They can be administered in admixture with pharmaceutical excipients which are edible and which are chemically inert to the aforementioned 9α-halogeno-11β-azido-steroids exemplified by cornstarch, lactose, sucrose, gum arabic usually in admixture with an additive such as magnesium stearate, talc, and the like. Other compositions may be used such as fine powders or granules of 9α-halogeno-11β-azido steroids, which compositions may contain diluents and dispersing and surface active agents, and may be presented in a syrup, or in non-aqueous suspensions, in aqueous suspensions or in an oil.

PREFERRED EMBODIMENTS OF COMPOSITION OF MATTER ASPECT

Of the foregoing classes of compounds of the composition of matter aspect of this invention, the preferred embodiment are the 9α-halogeno-11β-azido-1,4-pregnadiene-17α,21-diol-3,20-diones and their esters which exhibit anti-inflammatory activity. Of particular interest are the following compounds:

9α - chloro-11β-azido-16α-methyl-1,4-pregnadiene-17α, 21-diol-3,20-dione and the 17-valerate, 17,21-dipropionate, 21-phosphate, 21-acetate and the 21-carbethoxylate esters thereof, 9α - chloro-11β-azido-16β-methyl-1,4-pregnadiene-17α, 21-diol-3,20-dione and the 17-valerate, 17,21-dipropionate, 21-acetate and the 21-phosphate thereof, 9α-chloro - 11β - azido-1,4-pregnadience-17α,21-diol-3, 20-dione and the 21-acetate ester thereof, and 9α - chloro - 11β - azido-4-pregnene-17α,21-diol-3,20-dione and the 21-acetate esters thereof.

GENERAL DESCRIPTION OF PROCESS ASPECT OF INVENTION

One method of preparing the 9α-chloro-11β-azido and the 9α-bromo-11β-azido-steroids of Formula I is by the process aspect of this invention whereby a 9(11)-dehydro steroid preferably of the androstane and pregnane series, e.g. 16α - methyl-1,4,9(11)-pregnatriene-17α,21-diol-3,20-dione 21-acetate, in a lower alkanoic acid (e.g. acetic) is treated with an alkali metal azide (e.g. sodium azide) and a positive halogen donor (e.g. N-chlorosuccinimide or N-bromoacetamide) whereby is obtained the corresponding 9α-chloro-11β-azido- or 9α-bromo-11β-azido steroids, i.e. the physical embodiments of the composition-of-matter aspect of this invention, e.g. 9α-chloro-11β - azido-16α-methyl-1,4-pregnadiene-17α,21-diol,3,20-dione 21-acetate and 9α-bromo-11β-azido-16α-methyl-1,4-pregnadiene-17α,21-diol-3,20-dione 21-acetate respectively.

Halogenating agents which are sources of positive chlorine and bromine and which are useful in our process are such as molecular chlorine and bromine, N-chlorosuccinimide and N-bromosuccinimide, N-bromoacetamide, dimethyl-N,N-dibromohydantoin, and tribromophenolbromide.

The 9(11)-dehydro-steroids utilized as starting compounds are known in the art and may be prepared by known procedures such as described for example, in U.S. Patents Nos. 2,894,963; 3,009,938; 3,049,544; 3,009,927; 3,087,938; 3,009,930; 3,009,928; 3,009,929; 3,009,931; 3,131,200; 3,009,932; 3,290,338; 3,032,564; 3,026,339; 3,009,933; and 3,312,692. In preparing 9α - halogeno - 11β - azido steroids of Formula I which are substituted such as at C-2, C-6, C-7, C-15 and C-16 or which have additional unsaturations such as at C-1 and/or C-6, it is advantageous when utilizing the process aspect of this invention that all the desired substituents and/or unsaturations be present in the 9(11)-dehydro steroid prior to reaction with sodium azide and the source of positive halogen. It is also desirable to protect any primary or secondary alcohol groups present in the molecule, for example by esterification thereof, prior to reaction with sodium azide and positive bromine or chlorine. Thus, 6,9α-dichloro-11β - azido-16-methylene-17α-acetoxy-6-dehydro progesterone is preferably prepared by our process by reaction of 6 - chloro-16-methylene-17α-acetoxy-6,9(11)-bis-dehydroprogesterone in acetic acid with sodium azide and N-chlorosuccinimide.

The process of this invention is conveniently carried out in aqueous lower alkanoic acids such as acetic acid, propionic acid, N-butyric acid and the like. The lower alkanoic acid thus serves a dual role as solvent for the steroid and as a source of hydrogen ion for the positive halogen donor reagent. Our process is usually carried out at room temperature.

Generally when carrying out the physical embodiment of the process aspect of our invention a 9(11)-dehydrosteroid, e.g. 6α,16α-dimethyl-1,4,9(11)-pregnatriene-17α, 21-diol-3,20-dione 21-acetate is dissolved in acetic acid to which is added large molar excesses of sodium azide in aqueous acetic acid (usually saturated solutions thereof) to which is added at least a molar equivalent of the positive halogen donor and usually about two or three molar equivalents (e.g. at least one mole N-chlorosuccinimide or at least one mole N-bromoacetamide per mole of 9(11)-dehydro steroid. The reaction is usually continued at room temperature until the mixture tests negative to starch iodide paper. When an excess of halogenating agent is used, the starch iodide test is eliminated and the reaction continued until complete as evidenced by chromatographic analysis (to determine the absence of starting material). The 9α-halogeno-11β-azido-steroids produced by our process (e.g. 6α,16α-dimethyl-9α-chloro-11β-azido-1,4-pregnadiene-17α,21-diol-3,20-dione 21-acetate or 6α,16α-dimethyl-9α-bromo-11β-azido-1,4-pregnadiene-17α,21-diol-3,20-dione 21-acetate respectively) is conveniently isolated by pouring the reaction mixture into water and separating the precipitate by filtration or extraction with a suitable solvent. Purification is effected by techniques well known in the art such as by recrystallization, chromatography on adsorbants such as Florisil or silica gel, thin layer chromatography and the like.

The preferred mode of carrying out our process is that utilizing aqueous acetic acid as solvent, sodium azide and N-chlorosuccinimide as reagent when preparing the 9α-chloro-derivatives, or N-bromoacetamide as reagent when preparing the 9α-bromo derivatives.

Second process for preparing 9α-halogeno-11β-azido-steroids

The above represents the process aspect of this invention whereby are prepared the physical embodiments of the 9α-halogeno-11β-azido-steroids of the composition of matter aspect of this invention. Another method of preparing the 9α-halogeno-11β-azido-steroids of Formula I is by means of a replacement reaction described in copending application Ser. No. 551,926 of Hershel L. Herzog et al., filed May 23, 1966. By this process, a 9α-halogeno-11β-sulfonyloxy (preferably tosyloxy)-steroid in a polar solvent (preferably a hydroxylic solvent), advantageously kept at a pH in the range of from 6 to 7.5, is treated with a saturated solution of alkali metal azide (preferably sodium azide), whereby the 11β-sulfonyloxy function (e.g. tosyloxy) is replaced by the azido function with concomitant formation of a sulfonic acid (e.g. p-toluenesulfonic acid) and the corresponding 9α-halogeno-11β-azido-steroid.

Hydroxylic solvents advantageously used in this process include water, lower alkanols (preferably methanol), phenols, and hydrocarbon carboxylic acids, preferably lower alkanoic acids such as acetic and propionic, and mixtures of the foregoing.

Sulfonyloxy radicals at C-11 which may be replaced by azido according to this process include alkylsulfonyloxy radicals, e.g. methanesulfonyloxy (i.e. mesyloxy) and ethanesulfonyloxy; arylsulfonyloxy radicals, e.g. benzenesulfonyloxy and naphthalene-β-sulfonyloxy; aralkylsulfonyloxy radicals, e.g. p-toluenesulfonyl (i.e. tosyloxy), ortho-toluenesulfonyloxy, meta-toluenesulfonyloxy, 3,4-xylenesulfonyloxy and dodecylbenzenesulfonyloxy.

When carrying out this process utilizing as starting compound of 9α-halogeno - 11β-tosyloxy-21-hydroxy steroid, the 21-hydroxy group is preferably esterified, such as by a 21-phosphate, 21-carbethoxylate, or a 21-acetate ester.

In general, when carrying out this process, a solution of the 9α-chloro (or bromo)-11β-sulfonyloxy (e.g. tosyloxy)-steroid together with a saturated aqueous methanol solution of sodium azide are stirred together at moderate temperatures (usually in the range of from about 30° to 75° C.) until the reaction is complete as evidenced by chromatographic analysis (to determine the absence of starting material) as well as other techniques known in the art. Isolation of the resulting 9α-halogeno-11β-azido steroid is then effected according to procedures well known in the art.

In a preferred mode of the replacement process for preparing a 9α-halogeno-11β-azido-steroid, a 9α-chloro-11β-tosyloxy-steroid (e.g. 9α-chloro-16α-methylprednisolone 11-tosylate 21-acetate) is added to a saturated solution of sodium azide in aqueous methanol (e.g. 1:4 water-methanol) (said solution having been titrated to about pH 6 with acetic acid), and said reaction solution is stirred at about 60° C. for about 24 hours, whereby there is formed 9α-chloro-11β-azido-16α-methyl-1,4-pregnadiene-17α,21-diol - 3,20 - dione 21-acetate which is isolated and purified utilizing techniques known in the art.

In this foregoing replacement reaction, it is advantageous to buffer the reagent solutions thereof to a pH in the range of from about 4 to about pH 7.5 prior to addition of the 9α-halogeno-11β-tosyloxy steroid in order to minimize undesirable side reactions such as that between halogeno groups and strong base.

In general, the replacement process proceeds at a faster rate when carried out in the presence of water; thus, when replacing the 11β-tosyloxy group at C-11 an azide, it is advantageous to utilize aqueous methanol as solvent rather than anhydrous methanol. With the presence of water in the reaction mixture, in addition to effecting replacement of the 11β-tosyloxy group by azide, some 11β-hydroxy steroid is formed which is easily separated from the resulting 11β-azido derivative via chromatographic techniques.

The 9α-halogeno-11β-sulfonyloxy-steroids, necessary intermediates in the replacement process, preferably possess all the substituents and/or unsaturations desired in the 9α-halogeno-11β-azido final product.

The 9α-halogeno-11β-sulfonyloxy-intermediates are prepared via procedures known in the art from the corresponding 9(11)-dehydro steroid by reaction with p-toluenesulfonic acid in pyridine together with N-bromosuccinimide or N-chlorosuccinimide, for example, whereby are prepared the corresponding 9α-bromo-11β-tosyloxy and the 9α-chloro-11β-tosyloxy steroids, respectively. Some typical intermediates of this group are:

9α-chloro-11β-p-toluenesulfonyloxy-1,4-pregnadiene-17α,21-diol-3,20-dione 21-cathylate,
9α-chloro-11β-tosyloxy-1,4-androstadien-17β-ol-3-one 17-propionate
9α-chloro-11β-tosyloxy-19-nor-4-androstene-3,17-dione.

The following examples exemplify the preferred modes of preparing the physical embodiments of the composition aspects of our invention. It is to be understood that the examples are for purposes of illustration and are not to be construed as limiting the invention. Obvious equivalents including those set forth above will be apparent to one skilled in the art.

EXAMPLE 1

9α-chloro-11β-azido-16α-methyl-1,4-pregnadiene-17α,21-diol-3,20-dione

A. 9α-chloro-11β-azido-16α-methyl-1,4 - pregnadiene-17α,21-diol-3,20-dione 21-acetate (preparation via direct addition method).—Stir a solution of 4 g. of 16α-methyl-1,4,9(11)-pregnatriene-17α-21-diol-3,20-dione 21-acetate and 10 g. of sodium azide in 40 ml. of acetic acid and 10 ml. of water at room temperature and add 1.3 g. of N-chlorosuccinimide portion-wise over a one hour period, the dilute the reaction mixture with 20 ml. of acetic acid and add a second 10 g. portion of sodium azide. Stir another hour at room temperature while adding an additional 1.3 g. of N-chlorosuccinimide portion-wise. Stir until the reaction mixture tests negative to starch iodide paper (which is usually at the end of the 2-hour period), then pour the reaction mixture into 300 ml. of cold water and filter the resultant precipitate comprising 9α-chloro-11β-azido - 16α-methyl-1,4-pregnadiene-17α-21-diol-3,20-dione 21-acetate.

Purify by first chromatographing on Florisil eluting with increasing amount of ether in hexane. Combine the eluates of the 50–100% ether-in-hexane mixtures and concentrate to a residue. Further purify this residue via preparative thin-layer chromatography on silica gel utilizing as solvent ethylacetate/choroform 1:3. Extract with chloroform and chloro-azide product is determined by infrared and ultraviolet spectra. Recrystallize the residue of the chloroform extracts with ethyl acetate, M.P. 246–247° C. $[\alpha]_D^{25}$ +177.8° (dioxane).

$$\lambda_{max.}^{methanol} \ 238 \ m\mu \ (\epsilon=15,600)$$

B. 9α - chloro - 11β - azido - 16α - methyl - 1,4 - pregnadiene - 17α,21 - diol 3,20 - dione.—To a solution of 10 ml. of methanol and 0.6 ml. of chloroform containing 0.365 ml. of 70% perchloric acid add 0.18 g. of 9α-chloro-11β-azido-16α-methyl-1,4-pregnadiene-17α,21-diol-3,20 dione 21-acetate. Stir the reaction mixture at room temperature about 18 hours then pour into 100 ml. of water. Pass nitrogen into the reaction mixture for 45 minutes. Filter the resultant precipitate comprising 9α-chloro - 11β - azido - 16α - methyl - 1,4 - pregnadiene-17α,21-diol-3,20-dione.

EXAMPLE 2

9α - chloro - 11β - azido - 16α - methyl - 1,4 - pregnadiene-17α,21-diol 3,20-dione 21-acetate (via replacement of the 11β-tosyloxy group in 9α-chloro-11β-tosyloxy-16α-methyl-1,4-pregnadiene-17α,21-diol-3,20-dione 21-acetate)

A. 9α-chloro-11β-tosyloxy-16α-methyl-1,4-pregnadiene-

17α,21-diol-3,20-dione 21-acetate.—To a solution of 16α-methyl-1,4,9(11)-pregnatriene-17α,21-diol-3,20-dione 21-acetate (6.0 g.) in 600 ml. of pyridine, add 8 g. of sodium p-toluene sulfonate and 30 g. of p-toluene-sulfonic acid monohydrate. Concentrate the mixture to a volume of 300 ml., then add 4 g. of N-chlorosuccinimide and stir at room temperature for 24 hours. Pour the reaction mixture into 3 liters of cold 10%, aqueous sulfuric acid. Filter and air dry the resultant precipitate comprising 9α-chloro-11β - tosyloxy - 16α - methyl - 1,4 - pregnadiene - 17α, 21-diol-3,20-dione 21-acetate. Purify via chromatography on silica gel eluting with 15% ethyl acetate in chloroform. Evaporate the combined eluates to a residue, then crystallize the residue from acetone-hexane; M.P. 203–206° C., $[\alpha]_D^{25}$ +71.2° (dioxane), $\lambda_{max.}^{methanol}$ 230 mμ ($\epsilon$=19,500)

B. 9α - chloro-11β - azido - 16α - methyl - 1,4 - pregnadiene-17α,21-diol-3,20-dione 21-acetate.—To a solution of 100 g. of sodium azide in one liter of water and 2.5 liters of methanol, add acetic acid until the solution is at pH 6.0. Add 2 g. of 9α-chloro-11β-tosyloxy-16α-methyl-1,4-pregnadiene-17α,21-diol-3,20-dione 21-acetate and stir at 60° C. for 24 hours. Add 3 liters of water to the reaction mixture and extract with methylene chloride. Wash the methylene chloride extracts with water, dry over magnesium sulfate and concentrate to a residue comprising 9α - chloro - 11β - azido - 16α - methyl - 1,4 - pregnadiene-17α,21-diol 3,20-dione 21-acetate. Purify via preparative thin layer chromatography on silica gel utilizing as solvent ethyl acetate-cyclohexane (2:3). Extract with chloroform the chloro-azide product as determined by spectroscopic analysis, then recrystallize the residue of the chloroform extracts from ethyl acetate; M.P. 246–247° C., $[\alpha]_D^{25}$ +177.8° (dioxane), $\lambda_{max.}^{methanol}$ 238 mμ ($\epsilon$=15,600)

EXAMPLE 3

9α-chloro-11β-tosyloxy-16α-methyl-1,4-pregnadiene-17α,21-diol-3,20-dione 21-phosphate A. 16α-methyl-1,4,9(11)-pregnatriene-17α,21-diol-3,20-dione 21-methanesulfonate.—To a solution of 5 g. of 16α-methyl-1,4,9(11)-pregnatriene-17α,21-diol in 50 ml. of pyridine cooled to −20° C., add dropwise 5 ml. of methanesulfonyl chloride. Stir at −20° C. for 30 minutes then pour into water and stir for 2 hours longer at room temperature. Filter and dry the resultant precipitate comprising 16α - methyl - 1,4,9(11) - pregnatriene - 17α,21 - diol-3,20-dione 21-methane sulfonate. Purify by crystallizing from acetone-hexane (after charcoal treatment of the solution), M.P. 179–182° C.

B. 16α - methyl - 21 - iodo - 1,4,9(11) - pregnatriene-17α-ol-3,20-dione.—To 3.5 g. of 16α-methyl-1,4,9(11)-pregnatriene-17α,21-diol-3,20-dione 21-methanesulfonate in 52.5 ml. of acetone add 3.5 g. of sodium iodide. Heat the reaction mixture at reflux temperature for 20 minutes then pour into 500 ml. of water, filter and air dry the resultant precipitate comprising 16α-methyl-21-iodo-1,4,9(11)-pregnatrien-17α-ol-3,20-dione. Purify by crystallization from acetone-hexane, M.P. 143–144° C., $[\alpha]_D^{25}$ +56 (dioxane), $\lambda_{max.}^{methanol}$ 239 mμ ($\epsilon$=16,400)

C. 16α - methyl - 1,4,9(11) - pregnatriene - 17α,21-diol-3,20-dione 21-phosphate.—To 43 ml. of methanol at room temperature add dropwise with stirring 24 ml. of 85% aqueous phosphoric acid. Add cautiously 75.4 ml. of triethylamine followed by 12.7 g. of 16α-methyl-21-iodo-1,4,9(11)-pregnatrien-17α-ol-3,20-dione. Warm the reaction mixture on a steam bath for 30 minutes then with stirring pour into water (260 ml.) containing concentrated hydrochloric acid (72.5 ml.). Filter the resultant precipitate comprising 16α-methyl-1,4,9(11)-pregnatriene-17α,21-diol-3,20-dione 21-phosphate. Purify by crystallization from aqueous acetone.

D. 9α - chloro - 11β - tosyloxy - 16α - methyl - 1,4-pregnadiene-17α,21-diol-3,20-dione 21-phosphate. — Dissolve 10 g. of p-toluenesulfonic acid monohydrate in 200 ml. of pyridine and concentrate in vacuo to a volume of 100 ml. Add 2.733 g. of sodium p-toluenesulfonate, 1.371 g. of N-chlorosuccinimide and immediately 2 g. of 16α-methyl-1,4,9(11)-pregnatriene-17α,21-diol-3,30-dione 21-phosphate. Stir under an atmosphere of nitrogen for 18 hours. Pour the reaction mixture into 1 liter of 10% aqueous sulfonic acid then filter and air dry the resultant precipitate comprising 9α-chloro-11β-tosyloxy-16α-methyl-1,4-pregnadiene-17α,21-diol-3,20-dione 21-phosphate. Purify by crystallization from methanol-ethyl acetate, M.P. 182–185° C. (dec.).

$\lambda_{max.}^{methanol}$ 232 mμ ($\epsilon$=24,600)

EXAMPLE 4

9α - chloro - 11β - azido - 16α - methyl - 1,4 - pregnadiene-17α,21-diol-3,20-dione 21-acetate (via replacement of the 11β-tosyloxy group in 9α-chloro-11β-tosyloxy-16α-methyl-1,4-pregnadiene-17α,21-diol-3,20-dione 21-phosphate)

A. 9α - chloro - 11β - azido - 16α - methyl - 1,4 - pregnadiene-17α,21-diol-3,20-dione 21-phosphate.—Stir a reaction mixture of 1.6 g. of 9α-chloro-11β-tosyloxy-16α-methyl-1,4- pregnadiene - 17α,21-diol-3,20-dione 21-phosphate and 80 g. of sodium azide in 400 ml. of water for 2 days. Pour the reaction mixture into 8 liters of water, acidify with 150 ml. of concentrated hydrochloric acid, and extract with isoamyl-alcohol. Wash the combined isoamyl-alcohol extracts with water then evaporate to a residue comprising 9α - chloro-11β-azido-16α-methyl-1,4-pregnadiene-17α,21-diol-3,20-dione 21-phosphate which is used without further purification in procedure 4B immediately following.

B. 9α - chloro - 11β - azido - 16α - methyl - 1,4-pregnadiene-17α,21-diol-3,20-dione.—To 300 mg. of 9α-chloro-11β - azido - 16α - methyl - 1,4 - pregnadiene - 17α,21-diol-3,20-dione 21-phosphate (as prepared in Example 4A) dissolved in 6 ml. of a one molar aqueous solution of trishydroxymethylaminomethane titrated to pH 8 with hydrochloric acid, add 0.3 ml. of bacterial alkaline phosphatase (Worthington Biochemical Corporation, Freehold, N.J.—chromatographically purified grade). Maintain the reaction mixture at 37° C. for 20 minutes, add water and extract with methylene chloride. Combine the methylene chloride extracts, wash with water, dry over sodium sulfate and evaporate to a residue comprising 9α-chloro - 11β - azido - 16α - methyl - 1,4 - pregnadiene-17α,21-diol-3,20-dione. Purify by preparative thin-layer chromatography on silica gel utilizing as solvent ethyl acetate-cyclohexane (1:1). From the preparative plate extract the more polar product with acetone. Concentrate the acetone extract and crystallize the resultant residue from acetone-hexane to yield purified 9α-chloro-11β-azido-16α-methyl-1,4-pregnadiene-17α,21-diol-3,20-dione, M.P. 185–188° C. (dec.), $[\alpha]_D^{25}$ +155.8 (dioxane), $\lambda_{max.}^{methanol}$ 238 mμ ($\epsilon$=15,500)

C. 9α - chloro - 11β - azido - 16α - methyl - 1,4 - pregnadiene-17α,21-diol-3,20-dione 21-acetate.—To 100 mg. of 9α - chloro - 11β - azido - 16α - methyl - 1,4 - pregnadiene-17α,21-diol-3,20-dione in 3 ml. of pyridine add 2 ml. of acetic anhydride. Allow the reaction mixture to stand at room temperature 24 hours then pour into 50 ml. of water and filter and air dry the resultant precipitate comprising 9α - chloro - 11β - azido - 16α - methyl - 1,4 - pregnadiene-17α,21-diol-3,20-dione 21-acetate. Purify by crystallization from ethyl acetate, M.P. 246–247° C.

EXAMPLE 5

9α - chloro - 11β - azido - 16α - methyl - 1,4 - pregnadiene-17α,21-diol-3,20-dione 21-cathylate A. 9α - chloro - 11β - tosyloxy - 16α - methyl - 1,4-pregnadiene-17α,21-diol-3,20-dione 21-cathylate. — The requisite intermediate 16α-methyl-1,4,9(11)-pregnatriene-17α,21-diol-3,20-dione 21-cathylate is prepared from 16α-methyl - 1,4,9(11) - pregnatriene - 17α,21 - diol - 3,20-dione utilizing known procedures by treatment with ethyl-chlorocarbonate in pyridine at room temperature.

Dissolve 100 g. of p-toluenesulfonic acid monohydrate and 27.33 g. of sodium p-toluenesulfonate in one liter of pyridine and concentrate this solution in vacuo to about 500 ml. maintaining the temperature at about 40° C. Cool to room temperature and add 13.17 g. of recrystallized N-chlorosuccinimide followed immediately with 20 g. of 16α - methyl - 1,4,9(11) - pregnatriene - 17α,21 - diol-3,20-dione 21-cathylate (prepared as described above). Stir the reaction mixture at room temperature for 20 hours, then pour into 10 liters of an ice/water mixture containing one liter of concentrated sulfuric acid. Filter the resultant precipitate, wash to neutrality with water and air dry at 60° C. to give 9α-chloro-11β-tosyloxy-16α-methyl - 1,4 - pregnadiene - 17α,21 - diol - 3,20 - dione 21-cathylate. Purify by chromatography on silica gel eluting with 10–15% ethyl acetate in chloroform. Combine the early, like fractions and concentrate to a residue. Crystallize this residue from acetone-hexane to give 9α-chloro-11β - tosyloxy - 16α - methyl - 1,4 - pregnadiene - 17α,21-diol-3,20-dione 21-cathylate; M.P. 201–203° C. $[\alpha]_D$ +65° (dioxane), $\lambda_{max.}^{methanol}$ 231 mμ ($\epsilon$=26,600)

B. 9α - chloro - 11β - azido - 16α - methyl - 1,4 - pregnadiene - 17α,21 - diol - 3,20 - dione 21 - cathylate.—Add acetic acid to a solution of 150 g. of sodium azide in 1.5 liters of water and 1.5 liters of methanol until the pH of the solution is 6.6. Add 3 g. of 9α-chloro-11β-tosyloxy-16α - methyl-1,4 - pregnadiene - 17α,21 - diol - 3,20 - dione 21-cathylate and stir at 60° C. for 48 hours. Add 2 liters of water and extract with methylene chloride. Wash the combined methylene chloride extracts with water and dry over magnesium sulfate. Concentrate in vacuo to a residue comprising 9α - chloro - 11β - azido - 16α - methyl - 1,4-pregnadiene - 17α,21 - diol - 3,20 - dione 21-cathylate. Purify via preparative thin layer chromatography on silica gel utilizing ethyl acetate-cyclohexane (2:3) as solvent followed by crystallization from acetone-hexane to give 9α - chloro - 11β - azido - 16α - methyl - 1,4 - pregnadiene-17α,21-diol-3,20-dione 21-cathylate; M.P. 220–223° C. $[\alpha]_D$ +168.4° (dioxane), $\lambda_{max.}^{methanol}$ 238 mμ

EXAMPLE 6

9α - chloro - 11β-azido-17α-hydroxy-19-nor-progesterone (9α - chloro - 11β - azido - 19 - nor - 4 - pregnen-17α-ol-3,20-dione)

A. 9α - chloro-11β-tosyloxy-17α-hydroxy-19-nor-progesterone.—In a manner similar to that described in Example 5A, dissolve 48 g. of p-toluenesulfonic acid monohydrate and 9.7 g. of sodium p-toluenesulfonate in 600 ml. pyridine and concentrate the solution in vacuo to a volume of 400 ml. Add 4 g. of 17α-hydroxy-19-nor-4,9(11)-progesterone followed immediately by 1.9 g. of recrystallized N-chlorosuccinimide. Stir at room temperature for 18 hours. Isolate and purify the resultant product in a manner similar to that described in Example 5A to give 9α-chloro-11β-tosyloxy-17α-hydroxy-19-nor-progesterone.

B. 9α - chloro - 11β - azido-17α-hydroxy-19-nor-progesterone.—In a manner similar to that described in Example 2B, treat 9α-chloro-11β-tosyloxy-17α-hydroxy-19-nor-progesterone with sodium azide in methanol-water at pH 6.0 at 60° C. for 24 hours. Isolate and purify the resultant product in a manner similar to that described in Example 2B to obtain 9α-chloro-11β-azido-17α-hydroxy-nor-progesterone.

EXAMPLE 7

9α-chloro-11β-azido-1,4-androstadien-17β-ol-3-one

A. 9α - chloro-11β-tosyloxy-1,4-androstadien-17β-ol-3-one.—Dissolve 40 g. of p-toluenesulfonic acid monohydrate and 7 gm. of sodium p-toluene sulfonate in 600 ml. of pyridine. Then concentrate the solution in vacuo to about 300 ml. At room temperature add 3 gm. of 1,4,9 (11)-androstatrien-17β-ol-3-one followed immediately by 1.9 gm. of recrystallized N-chlorosuccinimide. Stir the reaction mixture at room temperature for 20 hours, then pour into 4 liters of iced water containing 400 ml. of concentrated sulfuric acid. Filter, wash to neutrality with water and air dry at 60° C., the resultant precipitate comprising 9α - chloro-11β-tosyloxy-1,4-androstadien-17β-ol-3-one. Purify via chromatography on silica gel, eluting with 10:15% ethyl acetate in chloroform. Concentrate the combined eluates and crystallize the resultant residue from acetone-hexane.

B. 9α - chloro - 11β-azido-1,4-androstadien-17β-ol-3-one.—In a manner similar to that described in Example 2B, treat 9α-chloro-11β-tosyloxy-1,4-androstadien-17β-ol-3-one with sodium azide in methanol-water at pH 6.0 for 24 hours at 60° C. Isolate and purify the resultant product to obtain 9α-chloro-11β-azido-1,4-androstadien-17β-ol-3-one.

EXAMPLE 8

9α-chloro-11β-azido-19-nor-4-androstene-3,17-dione

A. 9α - chloro-11β-tosyloxy-19-nor-4-androstene-3,17-dione.—Dissolve 70 g. of p-toluenesulfonic acid monohydrate and 19 g. of sodium p-toluene sulfonate in 1 liter of pyridine, then concentrate the solution to a volume of 500 ml. Add 5 g. of 19-nor-4,9(11)-androstadiene-3,17-dione followed immediately by 2.3 g. of recrystallized N-chlorosuccinimide and stir at room temperature for 18 hours. Pour the reaction mixture into 4 liters of iced water containing 400 ml. of concentrated sulfuric acid. Filter the resultant precipitate, wash to neutrality with water and air dry to yield 9α-chloro-11β-tosyloxy-19-nor-4-androstene-3,17-dione. Purify via chromatography on silica gel eluting with 10:15% ethyl acetate in chloroform. Concentrate the combined eluates and crystallize the resultant residue from acetone-hexane.

B. 9α - chloro - 11β - azido-19-nor-4-androstene-3,17-dione.—In a manner similar to that described in Example 2B, treat 9α - chloro-11β-tosyloxy-19-nor-4-androstene-3,17-dione with sodium azide in methanol-water at pH 6.0 for 24 hours at 60° C. Isolate and purify the resultant product in a manner similar to that described to obtain 9α-chloro-11β-azido-19-nor-4-androstene-3,17-dione.

EXAMPLE 9

9α-chloro-11β-azido-1,4-pregnadiene-16α,17α,21-triol-3,20-dione 16,21-diacetate

A. 9α - chloro - 11β-tosyloxy-1,4-pregnadiene-16α,17α, 21-triol-3,20-dione 16,21-diacetate.—In a manner similar to that described in Example 5A treat 1,4,9(11)-pregnatriene-16α,17α,21-triol-3,20-dione 16,21-diaceate with p-toluenesulfonic acid in pyridine followed by N-chlorosuccinimide. Isolate and purify the resultant product in a manner similar to that described to obtain 9α-chloro-11β-tosyloxy - 1,4-pregnadiene-16α,17α,21-triol-3,20-dione 16, 21-diacetate.

B. 9α - chloro - 11β-azido-1,4-pregnadiene-16α,17α,21-triol-3,20-dione 16,21-diacetate.—In a manner similar to that described in Example 5B treat 9α-chloro-β-tosyloxy-1,4 - pregnadiene-16α,17α,21-triol-3,20-dione 16,21-diacetate with sodium azide in aqueous methanol. Isolate and purify the resultant product in a manner similar to that described in Example 5B to obtain 9α-chloro-11β-azido-1,4 - pregnadiene-16α,17α,21-triol-3,20-dione 16,21-diacetate.

13
EXAMPLE 10

9α-chloro-11β-tosyloxy-4-pregnene-17α-21-diol-3,20-dione 21-phosphate intermediates A. 9(11) - dehydropregnane-21-methanesulfonate intermediates.—In a manner similar to that described in Example 3A treat each of the following 21-hydroxypregnanes in pyridine with methanesulfonyl chloride:

(1) 1,4,9(11)-pregnatriene-17α,21-diol-3,20-dione
(2) 16β-methyl-1,4,9(11)-pregnatriene-17α,21-diol-3,20-dione
(3) 6α-methyl-1,4,9(11)-pregnatriene-17α,21-diol-3,20-dione
(4) 2α-methyl-4,9(11)-pregnadiene-17α,21-diol-3,20-dione
(5) 16α-ethyl-4,9(11)-pregnadiene-17α,21-diol-3,20-dione
(6) 6α-methyl-4,9(11)-pregnadiene-17α,21-diol-3,20-dione Isolate and purify the resultant respective products in a manner similar to that described in Example 3A to obtain:

(1) 1,4,9(11)-pregnatriene-17α,21-diol-3,20-dione 21-fethanesulfonate
(2) 16β-methyl-1,4,9(11)-pregnatriene-17α,21-diol-3,20-dione 21-methanesulfonate
(3) 6α-methyl-1,4,9(11)-pregnatriene-17α,21-diol-3,20-dione 21-methanesulfonate
(4) 2α-methyl-4,9(11)-pregnadiene-17α,21-diol-3,20-dione 21-methanesulfonate
(5) 16α-ethyl-4,9(11)-pregnadiene-17α,21-diol-3,20-dione 21-methanesulfonate
(6) 6α-methyl-4,9(11)-pregnadiene-17α,21-diol-3,20-dione 21-methanesulfonate B. 21-iodo-9(11)-dehydropregnane intermediates.—In a manner similar to that described in Example 3B treat each of the pregnane 21-methanesulfonate esters prepared in Example 10A above (i.e. Products 10A–1–10A–6) with sodium iodide in acetone. Isolate and purify the resultant respective products in a manner similar to that described above to obtain respectively:

(1) 21-iodo-1,4,9(11)-pregnatriene-17α-ol-3,20-dione
(2) 16β-methyl-21-iodo-1,4,9(11)-pregnatriene-17α-ol-3,20-dione
(3) 6α-methyl 21-iodo-1,4,9(11)-pregnatriene-17α-ol-3,20-dione
(4) 2α-methyl-21-iodo-4,9(11)-pregnadiene-17α-ol-3,20-dione
(5) 16α-ethyl-21-iodo-4,9(11)-pregnadiene-17α-ol-3,20-dione
(6) 6α-methyl-21-iodo-4,9(11)-pregnadiene-17α-ol-3,20-dione C. 9,11 - dehydropregnane - 21 - phosphate intermediates.—In a manner similar to that described in Example 3C treat each of the 21-iodo products 3B–1–3B–6 with aqueous phosphoric acid in triethylamine. Isolate and purify the resultant respective products in a manner similar to that described to obtain respectively:

(1) 1,4,9(11)-pregnatriene-17α,21-diol-3,20-dione 21-phosphate
(2) 16β-methyl-1,4,9(11)-pregnatriene-17α,21-diol-3,20-dione 21-phosphate
(3) 6α-methyl-1,4,9(11)-pregnatriene-17α,21-diol-3,20-dione 21-phosphate
(4) 2α-methyl-4,9(11)-pregnadiene-17α,21-diol-3,20-dione 21-phosphate
(5) 16α-ethyl-4,9(11)-pregnadiene-17α,21-diol-3,20-dione 21-phosphate
(6) 6α-methyl-4,9(11)-pregnadiene-17α,21-diol-3,20-dione 21-phosphate D. 9α - chloro - 11β - tosyloxypregnane 21 - phosphate intermediates.—In a manner similar to that described in Example 3D treat each of the 9,11-dehydropregnane 21-phosphate intermediates 3C–1–3C–6 with p-toluenesulfonic acid in pyridine followed by sodium p-toluenesulfonate and N-chlorosuccinimide. Isolate and purify the resultant respective product in a manner similar to that described to obtain respectively:

(1) 9α-chloro-11β-tosyloxy-1,4-pregnadiene-17α,21-diol-3,20-dione 21-phosphate
(2) 9α-chloro-11β-tosyloxy-16β-methyl-1,4-pregnadiene-17α,21-diol-3,20-dione 21-phosphate
(3) 6α-methyl-9α-chloro-11β-tosyloxy-1,4-pregnadiene-17α,21-diol-3,20-dione 21-phosphate
(4) 2α-methyl-9α-chloro-11β-tosyloxy-4-pregnene-17α,21-diol-3,20-dione 21-phosphate
(5) 9α-chloro-11β-tosyloxy-16α-ethyl-4-pregnene-17α,21-diol-3,20-dione 21-phosphate
(6) 6α-methyl-9α-chloro-11β-tosyloxy-4-pregnene-17α,21-diol-3,20-dione 21-phosphate

EXAMPLE 11

9α-chloro-11β-azido-4-pregnene-17α,21-diol-3,20-diones

A. 9α - chloro - 11β - azido - 4 - pregnene - 17α,21-diol-3,20-diones as the 21-phosphate.—In a manner similar to that described in Example 4A treat each of the 9α - chloro - 11β - tosyloxypregnane 21 - phosphate products of Example 3D (i.e. compounds 3D–1 to 3D–6) with sodium azide in water. Isolate the resultant respective products in a manner similar to that described in Example 4A to obtain the following respective products:

(1) 9α-chloro-11β-azido-1,4-pregnadiene-17α,21-diol-3,20-dione 21-phosphate
(2) 9α-chloro-11β-azido-16β-methyl-1,4-pregnadiene-17α,21-diol-3,20-dione 21-phosphate
(3) 6α-methyl-9α-chloro-11β-azido-1,4-pregnadiene-17α,21-diol-3,20-dione 21-phosphate
(4) 2α-methyl-9α-chloro-11β-azido-4-pregnene-17α,21-diol-3,20-dione 21-phosphate
(4) 2α-methyl-9α-chloro-11β-azido-4-pregnene-17α,21-diol-3,20-dione 21-phosphate
(5) 9α-chloro-11β-azido-16α-ethyl-4-pregnene-17α,21-diol-3,20-dione 21-phosphate
(6) 6α-methyl-9α-chloro-11β-azido-4-pregnene-17α,21-diol-3,20-dione 21-phosphate B. 9α - chloro - 11β - azido - 4 - pregnene - 17α,21-diol-3,20-diones.—In a manner similar to that described in Example 4B treat each of the 9α-chloro-11β-azidopregnane 21-phosphate esters of Example 11A (i.e. products 11A–1–11A–6) in solution in trishydroxymethylaminomethane at pH 8 with bacterial alkaline phosphatase. Isolate and purify the resultant respective products in a manner similar to that described in Example 4B to obtain the following respective products:

(1) 9α-chloro-11β-azido-1,4-pregnadiene-17α,21-diol-3,20-dione
(2) 9α-chloro-11β-azido-16β-methyl-1,4-pregnadiene-17α,21-diol-3,20-dione
(3) 6α-methyl-9α-chloro-11β-azido-1,4-pregnadiene-17α,21-diol-3,20-dione
(4) 2α-methyl-9α-chloro-11β-azido-4-pregnene-17α,21-diol-3,20-dione
(5) 9α-chloro-11β-azido-16α-ethyl-4-pregnene-17α,21-diol-3,20-dione
(6) 6α-methyl-9α-chloro-11β-azido-4-pregnene-17α,21-diol-3,20-dione C. 9α - chloro - 11β-azido-4-pregnene-17α,21-diol-3,20-dione 21-acetates.—In a manner similar to that described in Example 4C treat each of the 9α-chloro-11β-azido-21-hydroxypregnanes of Example 11B (i.e. products 11B–1–11B–6) with acetic anhydride in pyridine. Isolate and purify the resultant product in a manner similar to that described to obtain respectively:

(1) 9α-chloro-11β-azido-1,4-pregnadiene-17α,21-diol-3,20-dione 21-acetate
(2) 9α-chloro-11β-azido-16β-methyl-1,4-pregnadiene-17α,21-diol-3,20-dione 21-acetate
(3) 6α-methyl-9α-chloro-11β-azido-1,4-pregnadiene-17α,21-diol-3,20-dione 21-acetate
(4) 2α-methyl-9α-chloro-11β-azido-4-pregnene-17α,21-diol-3,20-dione 21-acetate
(5) 9α-chloro-11β-azido-16α-ethyl-4-pregnene-17α,21-diol-3,20-dione 21-acetate
(6) 6α-methyl-9α-chloro-11β-azido-4-pregnene-17α,21-diol-3,20-dione 21-acetate In the above procedure by substituting other lower alkanoic anhydrides for acetic acid, e.g. propionic anhydride and valeric anhydride, there are obtained the respective lower alkanoate esters, i.e. the 21-propionate and 21-valerate respectively of compounds 11B–1–11B–6.

EXAMPLE 12

9α-chloro-11β-azido-progesterone derivatives

A. 9α - chloro - 11β - tosyloxy-progesterone intermediates.—In a manner similar to that described in Example 5A treat each of the following 9,11-dehydro-progesterones with p-toluenesulfonic acid monohydrate and sodium p-toluenesulfonate in pyridine followed by treatment with 10 grams N-chlorosuccinimide.

(1) 4,9(11)-pregnadiene-3,20-dione
(2) 1,4,9(11)-pregnatriene-3,20-dione
(3) 6α-methyl-4,9(11)-pregnadiene-3,20-dione
(4) 6β-methyl-1,4,9(11)-pregnatriene-3,20-dione
(5) 6α-methyl-21-fluoro-4,9(11)-pregnadiene-3,20-dione
(6) 17α-hydroxy-4,9(11)-pregnadiene-3,20-dione
(7) 17α-acetoxy-1,4,9(11)-pregnatriene-3,20-dione
(8) 17α-bromo-21-fluoro-4,9(11)-pregnadiene-3,20-dione
(9) 6α-methyl-17α-caprooxy-21-fluoro-4,9(11)-pregnadiene-3,20-dione
(10) 6α-methyl-17α-bromo-21-fluoro-4,9(1)-pregnadiene-3,20-dione
(11) 6α-methyl-17α-bromo-4,9(11)-pregnadiene-3,20-dione
(12) 6α-fluoro-4,9(11)-pregnadiene-3,20-dione
(13) 6β-methyl-4,9(11)-pregnadiene-3,20-dione
(14) 6β-fluoro-1,4,9(11)-pregnatriene-3,20-dione
(15) 16α-methyl-4,9(11)-pregnadiene-3,20-dione
(16) 6α,16α-dimethyl-4,9(11)-pregnadiene-3,20-dione
(17) 6α-fluoro-16α-methyl-4,9(11)-pregnadiene-3,20-dione
(18) 6α,16α-dimethyl-17α-hydroxy-4,9(11)-pregnadiene-3,20-dione
(19) 16α-methyl-17α-caprooxy-4,9(11)-pregnadiene-3,20-dione
(20) 6α-fluoro-16α-methyl-17α-acetoxy-4,9(11)-pregnadiene-3,20-dione
(21) 16α-methyl-17α-hydroxy-4,9(11)-pregnadiene-3,20-dione
(22) 16β-methyl-17α-hydroxy-4,9(11)-pregnadiene-3,20-dione
(23) 16β-methyl-4,9(11)-pregnadiene-3,20-dione
(24) 6β,16β-dimethyl-4,9(11)-pregnadiene-3,20-dione
(25) 16α-ethyl-4,9(11)-pregnadiene-3,20-dione
(26) 16β-N-butyl-4,9(11)-pregnadiene-3,20-dione
(27) 16α-N-butyl-4,9(11)-pregnadiene-3,20-dione
(28) 6α,16β-dimethyl-4,9(11)-pregnadiene-3,20-dione
(29) 6β-fluoro-16β-methyl-4,9(11)-pregnadiene-3,20-dione
(30) 6α,16β-dimethyl-17α-acetoxy-4,9(11)-pregnadiene-3,20-dione
(31) 6β-fluoro-16β-methyl-17α-acetoxy-4,9(11)-pregnadiene-3,20-dione
(32) 16β-methyl-17α-acetoxy-4,9(11)-pregnadiene-3,20-dione
(33) 6α,21-difluoro-1,4,9(11)-pregnatriene-3,20-dione
(34) 6α-methyl-17α-acetoxy-21-fluoro-4,9(11)-pregnadiene-3,20-dione
(35) 6α-methyl-17α-caprooxy-21-fluoro-4,9(11)-pregnadiene-3,20-dione
(36) 6α,21-difluoro-17α-hydroxy-4,9(11)-pregnadiene-3,20-dione
(37) 6α,21-difluoro-17α-caprooxy-4,9(11)-pregnadiene-3,20-dione
(38) 6α-fluoro-17α-bromo-4,9(11)-pregnadiene-3,20-dione
(39) 6α-methyl-21-fluoro-1,4,9(11)-pregnatriene-3,20-dione
(40) 6α-methyl-17α-hydroxy-4,9(11)-pregnadiene-3,20-dione
(41) 17α-hydroxy-1,4,9(11)-pregnatriene-3,20-dione
(42) 6α-fluoro-17α-acetoxy-4,9(11)-pregnadiene-3,20-dione
(43) 6α-fluoro-17α-acetoxy-19-nor-4-pregnene-3,20-dione
(44) 6α,17α-dimethyl-4,9(11)-pregnadiene-3,20-dione
(45) 6α-fluoro-17α-methyl-4,9(11)-pregnadiene-3,20-dione
(46) 6α-methyl-17α-bromo-4,9(11)-pregnadiene-3,20-dione
(47) 6α-fluoro-17α-bromo-4,9(11)-pregnadiene-3,20-dione
(48) 6α,17α-dimethyl-1,4,9(11)-pregnatriene-3,20-dione Isolate and purify the resultant respective product in a manner similar to that described in Example 5A to obtain respectively:

(1) 9α-chloro-11β-tosyloxy-4-pregnene-3,20-dione
(2) 9α-chloro-11β-tosyloxy-1,4-pregnadiene-3,20-dione
(3) 6α-methyl-9α-chloro-11β-tosyloxy-4-pregnene-3,20-dione
(4) 6β-methyl-9α-fluoro-11β-tosyloxy-1,4-pregnadiene-3,20-dione
(5) 6α-methyl-9α-chloro-11β-tosyloxy-21-fluoro-4-pregnene-3,20-dione
(6) 9α-chloro-11β-tosyloxy-17α-hydroxy-4-pregnene-3,20-dione
(7) 9α-chloro-11β-tosyloxy-17α-acetoxy-1,4-pregnadiene-3,20-dione
(8) 9α-chloro-11β-tosyloxy-17α-bromo-21-fluoro-4-pregnene-3,20-dione
(9) 6α-methyl-9α-chloro-11β-tosyloxy-17α-caprooxy-21-fluoro-4-pregnene-3,20-dione
(10) 6α-methyl-9α-chloro-11β-tosyloxy-17α-bromo-21-fluoro-4-pregnene-3,20-dione
(11) 6α-methyl-9α-chloro-11β-tosyloxy-17α-bromo-4-pregnene-3,20-dione
(12) 6α-fluoro-9α-chloro-11β-tosyloxy-4-pregnene-3,20-dione
(13) 6β-methyl-9α-chloro-11β-tosyloxy-4-pregnene-3,20-dione
(14) 6β-fluoro-9α-chloro-11β-tosyloxy-1,4-pregnadiene-3,20-dione
(15) 9α-chloro-11β-tosyloxy-16α-methyl-4-pregnene-3,20-dione
(16) 6α,16α-dimethyl-9α-chloro-11β-tosyloxy-4-pregnene-3,20-dione
(17) 6α-fluoro-9α-chloro-11β-tosyloxy-16α-methyl-4-pregnene-3,20-dione
(18) 6α,16α-dimethyl-9α-chloro-11β-tosyloxy-17α-hydroxy-4-pregnene-3,20-dione
(19) 9α-chloro-11β-tosyloxy-16α-methyl-17α-caprooxy-4-pregnene-3,20-dione
(20) 6α-fluoro-9α-chloro-11β-tosyloxy-16α-methyl-17α-acetoxy-4-pregnene-3,20-dione
(21) 9α-chloro-11β-tosyloxy-16α-methyl-17α-hydroxy-4-pregnene-3,20-dione
(22) 9α-chloro-11β-tosyloxy-16β-methyl-17α-hydroxy-4-pregnene-3,20-dione

(23) 9α-chloro-11β-tosyloxy-16β-methyl-4-pregnene-3,20-dione
(24) 6β,16β-dimethyl-9α-chloro-11β-tosyloxy-4-pregnene-3,20-dione
(25) 9α-chloro-11β-tosyloxy-16α-ethyl-4-pregnene-3,20-dione
(26) 9α-chloro-11β-tosyloxy-16β-n-butyl-4-pregnene-3,20-dione
(27) 9α-chloro-11β-tosyloxy-16α-n-butyl-4-pregnene-3,20-dione
(28) 6α,16β-dimethyl-9α-chloro-11β-tosyloxy-4-pregnene-3,20-dione
(29) 6β-fluoro-9α-chloro-11β-tosyloxy-16β-methyl-4-pregnene-3,20-dione
(30) 6α,16β-dimethyl-9α-chloro-11β-tosyloxy-17α-acetoxy-4-pregnene-3,20-dione
(31) 6β-fluoro-9α-chloro-11β-tosyloxy-16β-methyl-17α-acetoxy-4-pregnene-3,20-dione
(32) 9α-chloro-11β-tosyloxy-16β-methyl-17α-acetoxy-4-pregnene-3,20-dione
(33) 6α,21-difluoro-9α-chloro-11β-tosyloxy-1,4-pregnadiene-3,20-dione
(34) 6α-methyl-9α-chloro-11β-tosyloxy-17α-acetoxy-21-fluoro-4-pregnene-3,20-dione
(35) 6α-methyl-9α-chloro-11β-tosyloxy-17α-caprooxy-21-fluoro-4-pregnene-3,20-dione
(36) 6α,21-difluoro-9α-chloro-11β-tosyloxy-17α-hydroxy-4-pregnene-3,20-dione
(37) 6α,21-difluoro-9α-chloro-11β-tosyloxy-17α-caprooxy-4-pregnene-3,20-dione
(38) 6α-fluoro-9α-chloro-11β-tosyloxy-17α-bromo-4-pregnene-3,20-dione
(39) 6α-methyl-9α-chloro-11β-tosyloxy-21-fluoro-1,4-pregnadiene-3,20-dione
(40) 6α-methyl-9α-chloro-11β-tosyloxy-17α-hydroxy-4-pregnene-3,20-dione
(41) 9α-chloro-11β-tosyloxy-17α-hydroxy-1,4-pregnadiene-3,20-dione
(42) 6α-fluoro-9α-chloro-11β-tosyloxy-17α-acetoxy-4-pregnene-3,20-dione
(43) 6α-fluoro-9α-chloro-11β-tosyloxy-17α-acetoxy-19-nor-4-pregnene-3,20-dione
(44) 6α,17α-dimethyl-9α-chloro-11β-tosyloxy-4-pregnene-3,20-dione
(45) 6α-fluoro-9α-chloro-11β-tosyloxy-17α-methyl-4-pregnene-3,20-dione
(46) 6α-methyl-9α-chloro-11β-tosyloxy-17α-bromo-4-pregnene-3,20-dione
(47) 6α-fluoro-9α-chloro-11β-tosyloxy-17α-bromo-4-pregnene-3,20-dione
(48) 6α,17α-dimethyl-9α-chloro-11β-tosyloxy-1,4-pregnadiene-3,20-dione B. 9α-chloro-11β-azido-progesterones.—In a manner similar to that described in Example 2B treat each of the 9α-chloro-11β-tosyloxy-progesterone intermediates prepared in Example 12A with sodium azide in methanol water at pH 6.0 and at 60° C. for 24 hours. Isolate and purify the resultant respective products in a manner similar to that described in Example 2B to obtain the following respective products:

(1) 9α-chloro-11β-azido-4-pregnene-3,20-dione
(2) 9α-chloro-11β-azido-1,4-pregnadiene-3,20-dione
(3) 6α-methyl-9α-chloro-11β-azido-4-pregnene-3,20-dione
(4) 6β-methyl-9α-fluoro-11β-azido-1,4-pregnadiene-3,20-dione
(5) 6α-methyl-9α-chloro-11β-azido-21-fluoro-4-pregnene-3,20-dione
(6) 9α-chloro-11β-azido-17α-hydroxy-4-pregnene-3,20-dione
(7) 9α-chloro-11β-azido-17α-acetoxy-1,4(11)-pregnadiene-3,20-dione
(8) 9α-chloro-11β-azido-17α-bromo-21-fluoro-4-pregnene-3,20-dione
(9) 6α-methyl-9α-chloro-11β-azido-17α-caprooxy-21-fluoro-4-pregnene-3,20-dione
(10) 6α-methyl-9α-chloro-11β-azido-17α-bromo-21-fluoro-4-pregnene-3,20-dione
(11) 6α-methyl-9α-chloro-11β-azido-17α-bromo-4-pregnene-3,20-dione
(12) 6α-fluoro-9α-chloro-11β-azido-4-pregnene-3,20-dione
(13) 6β-methyl-9α-chloro-11β-azido-4-pregnene-3,20-dione
(14) 6β-fluoro-9α-chloro-11β-azido-1,4-pregnadiene-3,20-dione
(15) 9α-chloro-11β-azido-16α-methyl-4-pregnene-3,20-dione
(16) 6α,16α-dimethyl-9α-chloro-11β-azido-4-pregnene-3,20-dione
(17) 6α-fluoro-9α-chloro-11β-azido-16α-methyl-4-pregnene-3,20-dione
(18) 6α,16α-dimethyl-9α-chloro-11β-azido-17α-hydroxy-4-pregnene-3,20-dione
(19) 9α-chloro-11β-azido-16α-methyl-17α-caprooxy-4-pregnene-3,20-dione
(20) 6α-fluoro-9α-chloro-11β-azido-16α-methyl-17α-acetoxy-4-pregnene-3,20-dione
(21) 9α-chloro-11β-azido-16α-methyl-17α-hydroxy-4-pregnene-3,20-dione
(22) 9α-chloro-11β-azido-16β-methyl-17α-hydroxy-4-pregnene-3,20-dione
(23) 9α-chloro-11β-azido-16β-methyl-4-pregnene-3,20-dione
(24) 6β,16β-dimethyl-9α-chloro-11β-azido-4-pregnene-3,20-dione
(25) 9α-chloro-11β-azido-16α-ethyl-4-pregnene-3,20-dione
(26) 9α-chloro-11β-azido-16β-n-butyl-4-pregnene-3,20-dione
(27) 9α-chloro-11β-azido-16α-n-butyl-4-pregnene-3,20-dione
(28) 6α,16β-dimethyl-9α-chloro-11β-azido-4-pregnene-3,20-dione
(29) 6β-fluoro-9α-chloro-11β-azido-16β-methyl-4-pregnene-3,20-dione
(30) 6α,16β-dimethyl-9α-chloro-11β-azido-17α-acetoxy-4-pregnene-3,20-dione
(31) 6β-fluoro-9α-chloro-11β-azido-16β-methyl-17α-acetoxy-4-pregnene-3,20-dione
(32) 9α-chloro-11β-azido-16β-methyl-17α-acetoxy-4-pregnene-3,20-dione
(33) 6α,21-difluoro-9α-chloro-11β-azido-1,4-pregnadiene-3,20-dione
(34) 6α-methyl-9α-chloro-11β-azido-17α-acetoxy-21-fluoro-4-pregnene-3,20-dione
(35) 6α-methyl-9α-chloro-11β-azido-17α-caprooxy-21-fluoro-4-pregnene-3,20-dione
(36) 6α,21-difluoro-9α-chloro-11β-azido-17α-hydroxy-4-pregnene-3,20-dione
(37) 6α,21-difluoro-9α-chloro-11β-azido-17α-caprooxy-4-pregnene-3,20-dione
(38) 6α-fluoro-9α-chloro-11β-azido-17α-bromo-4-pregnene-3,20-dione
(39) 6α-methyl-9α-chloro-11β-azido-21-fluoro-1,4-pregnene-3,20-dione
(40) 6α-methyl-9α-chloro-11β-azido-17α-hydroxy-4-pregnene-3,20-dione
(41) 9α-chloro-11β-azido-17α-hydroxy-1,4-pregnadiene-3,20-dione
(42) 6α-fluoro-9α-chloro-11β-azido-17α-acetoxy-4-pregnene-3,20-dione
(43) 6α-fluoro-9α-chloro-11β-azido-17α-acetoxy-19-nor-4-pregnene-3,20-dione
(44) 6α,17α-dimethyl-9α-chloro-11β-azido-4-pregnene-3,20-dione
(45) 6α-fluoro-9α-chloro-11β-azido-17α-methyl-4-pregnene-3,20-dione

(46) 6α-methyl-9α-chloro-11β-azido-17α-bromo-4-pregnene-3,20-dione
(47) 6α-fluoro-9α-chloro-11β-azido-17α-bromo-4-pregnene-3,20-dione
(48) 6α,17α-dimethyl-9α-chloro-11β-azido-1,4-pregnadiene-3,20-dione

EXAMPLE 13

9α-chloro-11β-tosyloxy-androstanes

A. 9α-chloro-11β-tosyloxy-androstane intermediates.— In a manner similar to that described in Example 7A treat each of the following 9(11)-dehydro-androstanes with p-toluenesulfonic acid and sodium p-toluenesulfonate in pyridine followed by treatment with N-chlorosuccinimide:

(1) 4,9(11)-androstadiene-3,17-dione
(2) 6α-fluoro-19-nor-4,9(11)-androstadiene-3,17-dione
(3) 1,4,9(11)-androstatriene-17β-ol-3-one 17-acetate
(4) 17α-methyl-4,9(11)-androstadiene-17β-ol-3-one
(5) 17α-methyl-4,9(11)-androstadiene-17β-ol-3-one 17-propionate
(6) 6α-fluoro-4,9(11)-androstadiene-3,17-dione
(7) 1,4,9(11)-androstatriene-3,17-dione
(8) 6α-methyl-5α-9(11)-androstene-3,17-dione
(9) 5α-9(11)-androstene-17β-ol-3-one
(10) 6α-fluoro-5α-9(11)-androstene-17β-ol-3-one
(11) 6α-methyl-5α-9(11)-androstene-17β-ol-3-one
(12) 19-nor-5α-9(11)-androstene-3,17-dione
(13) 6α-fluoro-19-nor-5α-9(11)-androstene-3,17-dione
(14) 6α-methyl-19-nor-5α-9(11)-androstene-3,17-dione
(15) 19-nor-5α-9(11)-androstene-17β-ol-3-one
(16) 6α-fluoro-19-nor-5α-9(11)-androstene-17β-ol-3-one 17-propionate
(17) 6α-methyl-19-nor-5α-9(11)-androstene-17β-ol-3-one
(18) 17α-methyl-5α-9(11)-androstene-17β-ol-3-one
(19) 6α-fluoro-17α-methyl-5α-9(11)-androstene-17β-ol-3-one
(20) 6α,17α-dimethyl-5α-9(11)-androstene-17β-ol-3-one 17-valerate
(21) 17α-methyl-19-nor-5α-9(11)-androstene-17β-ol-3-one
(22) 6α-fluoro-17α-methyl-19-nor-5α-9(11)-androstene-17β-ol-3-one
(23) 6α,17α-dimethyl-19-nor-17β-ol-3-one-4,9(11)-androstadiene
(24) 6α17α-dimethyl-19-nor-5α-9(11)-androstene-17β-ol-3-one
(25) 17α-ethyl-19-nor-5α-9(11)-androstene-17β-ol-3-one
(26) 6α-methyl-4,9(11)-androstadiene-3,17-dione
(27) 16β-methyl-5α-9(11)-androstene-3,17-dione
(28) 1,4,9(11)-androstatriene-3,17-dione
(29) 6α-fluoro-1,4,9(11)-androstatriene-3,17-dione
(30) 6α-methyl-1,4,9(11)-androstatriene-3,17-dione
(31) 6β-methyl-19-nor-4,9(11)-androstadiene-3,17-dione
(32) 1,4,9(11)-androstatriene-17β-ol-3-one
(33) 6α-fluoro-17α-methyl-1,4-androstadiene-17β-ol-3-one
(34) 6α,17α-dimethyl-1,4,9(11)-androstatriene-17β-ol-3-one
(35) 16α-ethyl-1,4,9(11)-androstatriene-3,17-dione
(36) 17α-ethinyl-4,9(11)-androstadiene-17β-ol-3-one Isolated and purify each of the respective products produced thereby in a manner similar to that described in Example 7A to obtain the following respective compounds:

(1) 9α-chloro-11β-tosyloxy-4-androstene-3,17-dione
(2) 6α-fluoro-9α-chloro-11β-tosyloxy-19-nor-4-androstene-3,17-dione
(3) 9α-chloro-11β-tosyloxy-1,4-androstadiene-17β-ol-3-one 17-propionate
(4) 9α-chloro-11β-tosyloxy-17α-methyl-4-androstene-17β-ol-3-one
(5) 9α-chloro-11β-tosyloxy-17α-methyl-4-androstene-17β-ol-3-one 17-propionate
(6) 6α-fluoro-9α-chloro-11β-tosyloxy-4-androstene-3,17-dione
(7) 9α-chloro-11β-tosyloxy-1,4-androstadiene-3,17-dione
(8) 6α-methyl-9α-chloro-11β-tosyloxy-5α-androstane-3,17-dione
(9) 9α-chloro-11β-tosyloxy-5α-androstane-17β-ol-3-one
(10) 6α-fluoro-9α-chloro-11β-tosyloxy-5α-androstane-17β-ol-3-one
(11) 6α-methyl-9α-chloro-11β-tosyloxy-5α-androstane-17β-ol-3-one
(12) 9α-chloro-11β-tosyloxy-19-nor-5α-androstane-3,17-dione
(13) 6α-fluoro-9α-chloro-11β-tosyloxy-19-nor-5α-androstane-3,17-dione
(14) 6α-methyl-9α-chloro-11β-tosyloxy-19-nor-5α-androstane-3,17-dione
(15) 9α-chloro-11β-tosyloxy-19-nor-5α-androstane-17β-ol-3-one
(16) 6α-fluoro-9α-chloro-11β-tosyloxy-19-nor-5α-androstane-17β-ol-3-one 17-propionate
(17) 6α-methyl-9α-chloro-11β-tosyloxy-19-nor-5α-androstane-17β-ol-3-one
(18) 9α-chloro-11β-tosyloxy-17α-methyl-5α-androstane-17β-ol-3-one
(19) 6α-fluoro-9α-chloro-11β-tosyloxy-17α-methyl-5α-androstane-17β-ol-3-one
(20) 6α-17α-dimethyl-9α-chloro-11β-tosyloxy-5α-androstane-17β-ol-3-one
(21) 9α-chloro-11β-tosyloxy-17α-methyl-19-nor-5α-androstane-17β-ol-3-one
(22) 6α-fluoro-9α-chloro-11β-tosyloxy-17α-methyl-19-norr5α-androstane-17β-ol-3-one
(23) 6α,17α-dimethyl-9α-chloro-11β-tosyloxy-19-nor-4-androstene-17β-ol-3-one
(24) 6α,17α-dimethyl-19-nor-5α-androstane-17β-ol-3-one
(25) 9α-chloro-11β-tosyloxy-17α-ethyl-5α-androstane-17β-ol-3-one
(26) 9α-chloro-11β-tosyloxy-16α-methyl-4-androstene-3,17-dione
(27) 9α-chloro-11β-tosyloxy-16β-methyl-5α-androstane-3,17-dione
(28) 9α-chloro-11β-tosyloxy-1,4-androstadiene-3,17-dione
(29) 6α-fluoro-9α-chloro-11β-tosyloxy-1,4-androstadiene-3,17-dione
(30) 6α-methyl-9α-chloro-11β-tosyloxy-1,4-androstadiene-3,17-dione
(31) 6β-methyl-9α-chloro-11β-tosyloxy-19-nor-4-androstene-3,17-dione
(32) 9α-chloro-11β-tosyloxy-1,4-androstadiene-17β-ol-3-one
(33) 6α-fluoro-9α-chloro-11β-tosyloxy-17α-methyl-1,4-androstadiene-17β-ol-3-one
(34) 6α,17α-dimethyl-9α-chloro-11β-tosyloxy-1,4-androstadiene-17β-ol-3-one
(35) 9α-chloro-11β-tosyloxy-16α-ethyl-1,4-androstadiene-3,17-dione
(36) 9α-chloro-11β-tosyloxy-17α-ethinyl-4-androstene-17β-ol-3-one B. 9α-chloro-11β-tosyloxy-androstanes.—In a manner similar to that described in Example 2B treat each of the 9α-chloro-11β-tosyloxy-androstane intermediates prepared in Example 7A with sodium azide in methanol-water at pH 6 for 24 hours at 60° C. Isolate and purify the resultant respective products in a manner similar to that described in Example 2B to obtain respectively:

(1) 9α-chloro-11β-azido-4-androstene-3,17-dione
(2) 6α-fluoro-9α-chloro-11β-azido-19-nor-4-androstene-3,17-dione
(3) 9α-chloro-11β-azido-1,4-androstadiene-17β-ol-3-one 17-propionate
(4) 9α-chloro-11β-azido-17α-methyl-4-androstene-17β-ol-3-one (5) 9α-chloro-11β-azido-17α-methyl-4-androstene-17β-ol-3-one 17-propionate
(6) 6α-fluoro-9α-chloro-11β-azido-4-androstene-3,17-dione
(7) 9α-chloro-11β-azido-1,4-androstadiene-3,17-dione
(8) 6α-methyl-9α-chloro-11β-azido-5α-androstane-3,17-dione
(9) 9α-chloro-11β-azido-5α-androstane-17β-ol-3-one
(10) 6α-fluoro-9α-chloro-11β-azido-5α-androstane-17β-ol-3-one
(11) 6α-methyl-9α-chloro-11β-azido-5α-androstane-17β-ol-3-one
(12) 9α-chloro-11β-azido-19-nor-5α-androstane-3,17-dione
(13) 6α-fluoro-9α-chloro-11β-azido-19-nor-5α-androstane-3,17-dione
(14) 6α-methyl-9α-chloro-11β-azido-19-nor-5α-androstane-3,17-dione
(15) 9α-chloro-11β-azido-19-nor-5α-androstane-17β-ol-3-one
(16) 6α-fluoro-9α-chloro-11β-azido-19-nor-5α-androstane-17β-ol-3-one 17-propionate
(17) 6α-methyl-9α-chloro-11β-azido-19-nor-5α-androstane-17β-ol-3-one
(18) 9α-chloro-11β-azido-17α-methyl-5α-androstane-17β-ol-3-one
(19) 6α-fluoro-9α-chloro-11β-azido-17α-methyl-5α-androstane-17β-ol-3-one
(20) 6α,17α-dimethyl-9α-chloro-11β-azido-5α-androstane-17β-ol-3-one
(21) 9α-chloro-11β-azido-17α-methyl-19-nor-5α-androstane-17β-ol-3-one
(22) 6α-fluoro-9α-chloro-11β-azido-17α-methyl-19-nor-5α-androstane-17β-ol-3-one
(23) 6α,17α-dimethyl-9α-chloro-11β-azido-19-nor-4-androstene-17β-ol-3-one
(24) 6α,17α-dimethyl-19-nor-5α-androstane-17β-ol-3-one
(25) 9α-chloro-11β-azido-17α-ethyl-5α-androstane-17β-ol-3-one
(26) 9α-chloro-11β-azido-16α-methyl-4-androstene-3,17-dione
(27) 9α-chloro-11β-azido-16β-methyl-5α-androstane-3,17-dione
(28) 9α-chloro-11β-azido-1,4-androstadiene-3,17-dione
(29) 6α-fluoro-9α-chloro-11β-azido-1,4-androstadiene-3,17-dione
(30) 6α-methyl-9α-chloro-11β-azido-1,4-androstadiene-3,17-dione
(31) 6β-methyl-9α-chloro-11β-azido-19-nor-4-androstene-3,17-dione
(32) 9α-chloro-11β-azido-1,4-androstadiene-17β-ol-3-one
(33) 6α-fluoro-9α-chloro-11β-azido-17α-methyl-1,4-androstadiene-17β-ol-3-one
(34) 6α,17α-dimethyl-9α-chloro-11β-azido-1,4-androstadiene-17β-ol-3-one
(35) 9α-chloro-11β-azido-16α-ethyl-1,4-androstadiene-3,17-dione
(36) 9α-chloro-11β-azido-17α-ethinyl-4-androstene-17β-ol-3-one

EXAMPLE 14

9α - chloro - 11β - azido - 21 - hydroxy - 4 - pregnene-3,20-diones and 17-substituted 9α-chloro-11β-azido-21-hydroxy-4-pregnene-3,20-diones A. 21-hydroxy-9(11)-dehydropregnane 21 - phosphate intermediates.—In a manner similar to that described in Example 3C treat each of the following 21-iodo-9(11)-dehydroprogesterones with aqueous phosphoric acid in triethylamine:

(1) 21-iodo-4,9(11)-pregnadiene-3,20-dione
(2) 21-iodo-1,4,9(11)-pregnatriene-3,20-dione
(3) 21-iodo-19-nor-4,9(11)-pregnatriene-3,20-dione
(4) 6α-methyl-21-iodo-4,9(11)-pregnadiene-3,20-dione
(5) 17α-acetoxy-21-iodo-4,9(11)-pregnadiene-3,20-dione
(6) 17α-caprooxy-21-iodo-4,9(11)-pregnadiene-3,20-dione
(7) 6α-methyl-17α-acetoxy-21-iodo-4,9(11)-pregnadiene-3,20-dione
(8) 16β-methyl-21-iodo-4,9(11)-pregnadiene-3,20-dione
(9) 6α-fluoro-21-iodo-4,9(11)-pregnadiene-3,20-dione
(10) 6α-fluoro-21-iodo-1,4,9(11)-pregnatriene-3,20-dione
(11) 6α,17α-dimethyl-21-iodo-4,9(11)-pregnadiene-3,20-dione
(12) 6α-fluoro-17α-acetoxy-21-iodo-4,9(11)-pregnadiene-3,20-dione
(13) 6α-fluoro-17α-methyl-21-iodo-4,9(11)-pregnadiene-3,20-dione
(14) 6α,17α-dimethyl-21-iodo-1,4,9(11)-pregnatriene-3,20-dione Isolate and purify the resultant respective 21-phosphate ester products in a manner similar to that described in Example 3C to obtain respectively:

(1) 4,9(11)-pregnadien-21-ol-3,20-dione 21-phosphate
(2) 1,4,9(11)-pregnatrien-21-ol-3,20-dione 21-phosphate
(3) 19-nor-4,9(11)-pregnadien-21-ol-3,20-dione 21-phosphate
(4) 6α-methyl-4,9(11)-pregnadien-21-ol-3,20-dione 21-phosphate
(5) 17α-acetoxy-4,9(11)-pregnadien-21-ol-3,20-dione 21-phosphate
(6) 17α-caprooxy-4,9(11)-pregnadien-21-ol-3,20-dione 21-phosphate
(7) 6α-methyl-17α-acetoxy-4,9(11)-pregnadien-21-ol-3,20-dione 21-phosphate
(3) 19-nor-4,9(11)-pregnadien-21-ol-3,20-dione 21-phosphate
(9) 6α-fluoro-4,9(11)-pregnadien-21-ol-3,20-dione 21-phosphate
(10) 6α-fluoro-1,4,9(11)-pregnatrien-21-ol-3,20-dione 21-phosphate
(11) 6α,17α-dimethyl-4,9(11)-pregnadien-21-ol-3,20-dione 21-phosphate
(12) 6α-fluoro-17α-acetoxy-4,9(11)-pregnadien-21-ol-3,20-dione 21-phosphate
(13) 6α-fluoro-17α-methyl-4,9(11)-pregnadien-21-ol-3,20-dione 21-phosphate
(14) 6α,17α-dimethyl-1,4,9(11)-pregnatrien-21-ol-3,20-dione 21-phosphate B. 9α - chloro - 11β - tosyloxy - 21 - hydroxypregnane 21 - phosphate intermediates.—In a manner similar to that described in Example 3D treat each of the 21-hydroxy - 9(11) - dehydropregnane 21 - phosphate intermediates prepared in preceding Example 14A with p-toluene-sulfonic acid and sodium p-toluenesulfonate in pyridine followed by 1.1 g. N - chlorosuccinimide under an atmosphere of nitrogen. Isolate and purify the resultant product in a manner similar to that described in Example 3D to obtain the following:

(1) 9α-chloro-11β-tosyloxy-4-pregnen-21-ol-3,20-dione 21-phosphate
(2) 9α-chloro-11β-tosyloxy-1,4-pregnadient-21-ol-3,20-dione 21-phosphate
(3) 9α-chloro-11β-tosyloxy-19-nor-4-pregnen-21-ol-3,20-dione 21-phosphate
(4) 6α-methyl-9α-chloro-11β-tosyloxy-4-pregnen-21-ol-3,20-dione 21-phosphate
(5) 9α-chloro-11β-tosyloxy-17α-acetoxy-4-pregnen-21-ol-3,20-dione 21-phosphate
(6) 9α-chloro-11β-tosyloxy-17α-caprooxy-4-pregnen-21-ol-3,20-dione 21-phosphate
(7) 6α-methyl-9α-chloro-11β-tosyloxy-17α-acetoxy-4-pregnen-21-ol-3,20-dione 21-phosphate
(8) 9α-chloro-11β-tosyloxy-16β-methyl-14-pregnen-21-ol-3,20-dione 21-phosphate
(9) 6α-fluoro-9α-chloro-11β-tosyloxy-4-pregnen-21-ol-3,20-dione 21-phosphate

(10) 6α-fluoro-9α-chloro-11β-tosyloxy-1,4-pregnadien-21-ol-3,20-dione 21-phosphate
(11) 6α,17α-dimethyl-9α-chloro-11β-tosyloxy-4-pregnen-21-ol-3,20-dione 21-phosphate
(12) 6α-fluoro-9α-chloro-11β-tosyloxy-17α-acetoxy-4-pregnen-21-ol-3,20-dione 21-phosphate
(13) 6α-fluoro-9α-chloro-11β-tosyloxy-17α-methyl-4-pregnen-21-ol-3,20-dione 21-phosphate
(14) 6α,17α-dimethyl-9α-chloro-11β-tosyloxy-1,4-pregnadien-21-ol-3,20-dione 21-phosphate C. 9α - chloro - 11β - azido - 4 - pregnen - 21 - ol-3,20 - dione 21 -phosphates.—In a manner similar to that described in Example 4A treat each of the 9α-chloro-11β - tosyloxy - 21 - hydroxypregnane 21 - phosphate intermediates prepared in Example 14B with sodium azide in water. Isolate the resultant respective products in a manner similar to that described to obtain the following respective products:

(1) 9α-chloro-11β-azido-4-pregnen-21-ol-3,20-dione 21-phosphate
(2) 9α-chloro-11β-azido-1,4-pregnadien-21-ol-3,20-dione 21-phosphate
(3) 9α-chloro-11β-azido-19-nor-4-pregnen-21-ol-3,20-dione 21-phosphate
(4) 6α-methyl-9α-chloro-11β-azido-4-pregnen-21-ol-3,20-dione 21-phosphate
(5) 9α-chloro-11β-azido-17α-acetoxy-4-pregnen-21-ol-3,20-dione 21-phosphate
(6) 9α-chloro-11β-azido-17α-caprooxy-4-pregnen-21-ol-3,20-dione 21-phosphate
(7) 6α-methyl-9α-chloro-11β-azido-17α-acetoxy-4-pregnen-21-ol-3,20-dione 21-phosphate
(8) 9α-chloro-11β-azido-16β-methyl-4-pregnen-21-ol-3,20-dione 21-phosphate
(9) 6α-fluoro-9α-chloro-11β-azido-4-pregnen-21-ol-3,20-dione 21-phosphate
(10) 6α-fluoro-9α-chloro-11β-azido-1,4-pregnadien-21-ol-3,20-dione 21-phosphate
(11) 6α,17α-dimethyl-9α-chloro-11β-azido-4-pregnen-21-ol-3,20-dione 21-phosphate
(12) 6α-fluoro-9α-chloro-11β-azido-17α-acetoxy-4-pregnen-21-ol-3,20-dione 21-phosphate
(13) 6α-fluoro-9α-chloro-11β-azido-17α-methyl-4-pregnen-21-ol-3,20-dione 21-phosphate
(14) 6α,17α-dimethyl-9α-chloro-11β-azido-1,4-pregnadien-21-ol-3,20-dione 21-phosphate D. 9α - chloro - 11β - azido - 4 - pregnen - 21 - ol-3,20 - diones and 17 - substituted derivatives thereof.—In a manner similar to that described in Example 4B treat each of the pregnane-21-phosphate esters prepared in Example 14C with bacterial alkaline phosphatase in trishydroxymethylamino methane tritrated to pH 8. Isolated and purify the resultant respective products in a manner similar to that described to obtain respectively:

(1) 9α-chloro-11β-azido-4-pregnen-21-ol-3,20-dione
(2) 9α-chloro-11β-azido-1,4-pregnadien-21-ol-3,20-dione
(3) 9α-chloro-11β-azido-19-nor-4-pregnen-21-ol-3,20-dione
(4) 6α-methyl-9α-chloro-11β-azido-4-pregnen-21-ol-3,20-dione
(5) 9α-chloro-11β-azido-17α-acetoxy-4-pregnen-21-ol-3,20-dione
(6) 9α-chloro-11β-azido-17α-caprooxy-4-pregnen-21-ol-3,20-dione
(7) 6α-methyl-9α-chloro-11β-azido-17α-acetoxy-4-pregnen-21-ol-3,20-dione
(8) 9α-chloro-11β-azido-16β-methyl-4-pregnen-21-ol-3,20-dione
(9) 6α-fluoro-9α-chloro-11β-azido-4-pregnen-21-ol-3,20-dione
(10) 6α-fluoro-9α-chloro-11β-azido-1,4-pregnadien-21-ol-3,20-dione
(11) 6α,17α-dimethyl-9α-chloro-11β-azido-4-pregnen-21-ol-3,20-dione
(12) 6α-fluoro-9α-chloro-11β-azido-17α-acetoxy-4-pregnen-21-ol-3,20-dione
(13) 6α-fluoro-9α-chloro-11β-azido-17α-methyl-4-pregnen-21-ol-3,20-dione
(14) 6α,17α-dimethyl-9α-chloro-11β-azido-1,4-pregnadien-21-ol-3,20-dione.

E. 9α-chloro-11β-azido-4-pregnen-21-ol-3,20-dione 21-acetate.—In a manner similar to that described in Example 4C treat each of the 9α-chloro-11β-azido-21-hydroxy-4-pregnene-3,20-diones prepared in Example 14D with acetic anhydride in pyridine. Isolate and purify the resultant respective products in a manner similar to that described to obtain respectively:

(1) 9α-chloro-11β-azido-4-pregnen-21-ol-3,20-dione 21-acetate
(2) 9α-chloro-11β-azido-1,4-pregnadien-21-ol-3,20-dione 21-acetate
(3) 9α-chloro-11β-azido-19-nor-4-pregnen-21-ol-3,20-dione 21-acetate
(4) 6α-methyl-9α-chloro-11β-azido-4-pregnen-21-ol-3,20-dione 21-acetate
(5) 9α-chloro-11β-azido-17α-acetoxy-4-pregnen-21-ol-3,20-dione 21-acetate
(6) 9α-chloro-11β-azido-17α-caprooxy-4-pregnen-21-ol-3,20-dione 21-acetate
(7) 6α-methyl-9α-chloro-11β-azido-17α-acetoxy-4-pregnen-21-ol-3,20-dione 21-acetate
(8) 9α-chloro-11β-azido-16β-methyl-4-pregnen-21-ol-3,20-dione 21-acetate
(9) 6α-fluoro-9α-chloro-11β-azido-4-pregnen-21-ol-3,20-dione 21-acetate
(10) 6α-fluoro-9α-chloro-11β-azido-1,4-pregnadien-21-ol-3,20-dione 21-acetate
(11) 6α,7α-dimethyl-9α-chloro-11β-azido-4-pregnene-21-ol-3,20-dione 21-acetate
(12) 6α-fluoro-9α-chloro-11β-azido-17α-acetoxy-4-pregnen-21-ol-3,20-dione 21-acetate
(13) 6α-fluoro-9α-chloro-11β-azido-17α-methyl-4-pregnen-21-ol-3,20-dione 21-acetate
(14) 6α,17α-dimethyl-9α-chloro-11β-azido-1,4-pregnadien-21-ol-3,20-dione 21-acetate In the procedure in this example by substituting for acetic anhydride the acid anhydride of other lower alkanoic acids, e.g. by propionic acid anhydride, by caproic acid anhydride or by valeric acid anhydride, there is obtained the corresponding 21-lower alkanoate esters, e.g. the 21-propionate, the 21-caproate and the 21-valerate of the 21-hydroxy compound prepared in Example 14D.

EXAMPLE 15

9α-bromo-11β-azido-16α-methyl-1,4-pregnadiene-17α,21-diol-3,20-dione

A. 9α - bromo - 11β - azido - 16α - methyl - 1,4 - pregnadiene - 17α,21 - diol - 3,20 - dione 21 - acetate.—To a solution of 4 g. of 16α-methyl-1,4,9(11)-pregnatriene-17α,21-diol-3,20-dione 21-acetate and 10 g. of sodium azide in 40 ml. of acetic acid and 10 ml. water, add portion-wise over a period of 1 hour 1.3 g. of N-bromoacetamide. Dilute the reaction mixture with 20 ml. of acetic acid, then add 10 g. of sodium azide. Over an additional 1 hour period add a second 1.3 portion of N-bromoacetamide. Stir the reaction mixture until it tests negative to starch iodide paper, then pour into 300 ml. of cold water and filter. Purify the column chromatography on silica gel eluting with 50–100% ether in hexane mixture. Distil the combined eluates to a residue comprising 9α - bromo - 11β - azido - 16α - methyl - 1,4 - pregnadiene - 17α,21 - diol - 3,20 - dione 21 - acetate.

In a similar manner treat each of the following 9(11)-dehydro steroids with sodium azide and N-bromoacetamide in acetic acid:

(1) 16α-methyl-1,4,9(11)-pregnatriene-17α,21-diol-3,20-dione 21-cathylate
(2) 1,4,9(11)-pregnatriene-17α,21-diol-3,20-dione 21-acetate
(3) 1,4,9(11)-pregnatriene-16α,17α,21-triol-3,20-dione 16,21-diacetate
(4) 16β-methyl-1,4,9(11)-pregnatriene-17α,21-diol-3,20-dione 21-acetate
(5) 6α-methyl-1,4,9(11)-pregnatriene-17α,21-diol-3,20-dione 21-acetate
(6) 2α-methyl-4,9(11)-pregnadiene-17α,21-diol-3,20-dione 21-acetate
(7) 1,4,9(11)-pregnatriene-17α,21-diol-3,20-dione 21-cathylate Isolate and purify the resultant respective products in a manner similar to that described above to obtain respectively:
(1) 9α-bromo-11β-azido-16α-methyl-1,4-pregnadiene-17α,21-diol-3,20-dione 21-cathylate
(2) 9α-bromo-11β-azido-1,4-pregnadiene-17α,21-diol-3,20-dione 21-acetate
(3) 9α-bromo-11β-azido-1,4-pregnadiene-16α,17α,21-triol-3,20-dione 16,21-diacetate
(4) 9α-bromo-11β-azido-16β-methyl-1,4-pregnadiene-17α,21-diol-3,20-dione 21-acetate
(5) 6α-methyl-9α-bromo-11β-azido-1,4-pregnadiene-17α,21-diol-3,20-dione 21-acetate
(6) 2α-methyl-9α-bromo-11β-azido-4-pregnene-17α,21-diol-3,20-dione 21-acetate
(7) 9α-bromo-11β-azido-1,4-pregnadiene-17α,21-diol-3,20-dione 21-cathylate B. 9α - bromo - 11β - azido - 16α - methyl - 1,4 - pregnadiene - 17α,21 - diol - 3,20 - dione.—In a manner similar to that described in Example 1B treat 9α-bromo-11β - azido - 16α - methyl - 1,4 - pregnadiene - 17α,21 - diol - 3,20 - dione 21 - acetate with 70% perchloric acid in methanol and chloroform solution. Isolate the resultant product in a manner similar to that described to obtain 9α - bromo - 11β - azido - 16α - methyl 1,4 -pregnadiene - 17α,21 - diol - 3,20 - dione.

In a similar manner hydrolyze the 21-esters of each of the following prepared as described in the second paragraph of Example 15A to obtain respectively:
(1) 9α-bromo-11β-azido-16α-1,4-pregnadiene-17α,21-diol-3,20-dione
(2) 9α-bromo-11β-azido-1,4-pregnadien-17α,21-diol-3,20-dione
(3) 9α-bromo-11β-azido-1,4-pregnadiene-16α,17α,21-triol-3,20-dione
(4) 9α-bromo-11β-azido-16β-methyl-1,4-pregnadiene-17α,21-diol-3,20-dione
(5) 6α-methyl-9α-bromo-11β-azido-1,4-pregnadiene-17α,21-diol-3,20-dione
(6) 2α-methyl-9α-bromo-11β-azido-4-pregnene-17α,21-diol-3,20-dione
(7) 9α-bromo-11β-azido-1,4-pregnadiene-17α,21-diol-3,20-dione

EXAMPLE 16

9α-bromo-11β-azido-androstanes and pregnanes

In a manner similar to that described in Example 15A, treat 17α-acetoxy-4,9(11)-pregnadiene-3,20-dione with sodium azide in aqueous acetic acid followed by n-bromoacetamide. Isolate and purify the resultant product in a manner similar to that described to obtain 9α-bromo-11β-azido-17α-acetoxy - 4 - pregnene-3,20-dione (9α-bromo-11β-azido-17α-acetoxy progesterone).

In a similar manner treat each of the following 9(11)-dehydro pregnanes and androstanes with sodium azide and n-bromoacetamide in acetic acid:
(1) 16α-methyl-17α-acetoxy-4,9(11)-pregnadiene-3,20-dione
(2) 17α-hydroxy-19-nor-4,9(11)-pragnadiene-3,20-dione
(3) 17α-hydroxy-21-fluoro-4,9(11)-pregnadiene-3,20-dione
(4) 1,4,9(11)-androstatrien-17β-ol-3-one
(5) 17α-methyl-4,9(11)-pregnadien-17β-ol-3-one
(6) 19-nor-4,9(11)-androstadiene-3,17-dione
(7) 4,9(11)-androstadiene-3,17-dione Isolate and purify the resultant respective products in a manner similar to that described above to obtain respectively,
(1) 9α-bromo-11β-azido-16α-methyl-17α-acetoxyprogesterone
(2) 9α-bromo-11β-azido-17α-hydroxy-19-nor-progesterone
(3) 9α-bromo-11β-azido-17α-hydroxy-21-fluoroprogesterone
(4) 9α-bromo-11β-azido-1,4-androstadien-17β-ol-3-one
(5) 9α-bromo-11β-azido-17α-methyl-4-androsten-17β-ol-3-one
(6) 9α-bromo-11β-azido-17α-ethinyl-4-androsten-17β-ol-3-one
(7) 9α-bromo-11β-azido-19-nor-4-androstene-3,17-dione
(8) 9α-bromo-11β-azido-4-androstene-3,17-dione.

In a similar manner each one of the 9(11)-dehydro starting steroids listed in the foregoing Examples 1 through 15, upon treatment with sodium azide and n-bromoacetamide in acetic acid in the above described manner, will yield the corresponding 9α-bromo-11β-azido derivative.

EXAMPLE 17

Preparation of 9(11)-dehydro androstane and pregnane intermediates

A. 16α-methyl-1,4,9(11)-pregnatriene - 17α,21 - diol-3,20-dione-17,21-dipropionate and the 16β-methyl- and 16-desmethyl-analogs thereof.—(1) Reflux a soluļtion of 5g. of 16α-methyl-1,4-pregnadiene-11β,17α,21-triol-3,20-dione in 1.3 liters of benzene under anhydrous conditions with a Dean-Stark tube. After taking off 165 ml. of benzene add 1.65 molar equivalents of triethyl-orthopropionate followed by about 0.1 molar equivalents of p-toluenesulfonic acid monohydrate. Heat at reflux temperature under a Dean-Stark tube for two hours longer, then cool to room temperature and add 5 g. of sodium bicarbonate and 5 ml. of pyridine. Concentrate the reaction mixture in vacuo to a residue. Triturate the residue with hexane-ethyl ether and filter the resultant precipitate comprising 16α-methyl-1,4-pregnadiene-11β,17α,21 - triol-3,20-dione 17,21-methyl orthopropionate which is used without further purification in the step immediately following.

(2) Add 3 g. of 16α-methyl-1,4-pregnadiene-11β,17α,21-triol-3,20-dione 17,21-methyl orthopropionate to 45 ml. of acetic acid containing 0.9 ml. of water. Stir the reaction mixture at room temperature for about 18 hours, then pour into 450 ml. of water and filter the resultant product comprising 16α-methyl-1,4-pregnadiene-11β,17α,21-triol-3,20-dione 17-propionate. Purify by recrystallization from acetone-hexane.

(3) Add 1 g. of 16α-methyl-1,4-pregnadiene-11β,17α,21-triol-3,20-dione 17-propionate to a solution of 5 ml. pyridine and 1 ml. of propionic anhydride. Allow the reaction mixture to stand at room temperature for 18 hours, then dilute with water and extract with methylene chloride. Evaporate the combined methylene chloride eluates to a residue comprising 16α-methyl-1,4-pregnadiene-11β,17α,21-triol-3,20-dione 17,21-dipropionate.

(4) To a solution of 1 g. of 16α-methyl-1,4-pregnadiene-11β,17α,21-triol-3,20-dione 17,21-dipropionate in 5 ml. of distilled dimethylformamide, and 5 g. of anhydrous pyridine, add 0.5 ml. of methanesulfonyl chloride and heat the mixture at about 80° C. for one hour. Cool the solution, pour into ice water and filter the resultant precipitate. After drying precipitate, dissolve it in acetone and treat the acetone solution with decolorizing carbon. Evaporate the pure acetone solution to a residue and chromatograph the residue on silica gel eluting with increasing amounts of ether-in-hexane. Combine the like fractions as determined by thin layer and spectroscopic data. Evaporate the combined eluates in vacuo to a residue comprising 16α-methyl-1,4,9(11)-pregnatriene - 17α,21 - diol-3,20-dione 17,21-dipropionate.

In a similar manner, by going through a sequence of reactions similar to that described in Procedure 17A–1 to 17A–4 by utilizing as starting compounds each of 16β-methyl - 1,4 - pregnadiene-11β,17α,21-triol-3,20-dione and 1,4,9(11)-pregnatriene-17α,21-diol-3,20-dione, there is obtained respectively 16β - methyl-1,4,9(11)-pregnatriene-17α,21-diol-3,20-dione 17,21-propionate and 1,4,9(11)-pregnatriene-17α,21-diol-3,20-dion 17,21-dipropionate.

B. 16α-methyl-1,4,9(11)-pregnatriene-17α,21-diol-3,20-dione 17-valerate 21-acetate and the 16β-methyl and 16-desmethyl analogs thereof.—In a manner similar to that described in Example 7A (procedure 1 through 4), treat 16α-methyl - 1,4 - pregnadiene-11β,17α,21-triol-3,20-dione with trimethyl orthovalerate and p-toluenesulfonic acid monohydrate to obtain 16α-methyl-1,4-pregnadiene-11β,17α,21-triol-3,20-dione 17,21-methyl orthovalerate which, upon treatment with aqueous acetic acid at room temperature in the manner of procedure 17A–2 yields 16α-methyl - 1,4 - pregnadiene-11β,17α,21-triol-3,20-dione 17-valerate. Esterification of the 17-monovalerate thereby obtained with acetic anhydride in pyridine in a manner similar to that described in Example 17A–3 yields 16α-methyl - 1,4 - pregnadiene-11β,17α,21-triol-3,20-dione 17-valerate 21-acetate which in turn, upon treatment with methanesulfonyl chloride and pyridine in dimethylformamide is converted to 16α-methyl-1,4,9(11)-pregnatriene-17α,21-diol-3,20-dione 17-valerate 21-acetate.

Similarly, 16β-methyl-1,4-pregnadiene-11β,17α,21-triol-3,20-dione and 1,4-pregnadiene - 11β,17α,21 - triol-3,20-dione are each subjected to the sequence of reactions similar to that described above and there is obtained respectively, 16β - methyl - 1,4,9(11)-pregnatriene-17α,21-diol-3,20-dione 17-valerate 21-acetate and 1,4,9(11)-pregnatriene-17α,21-diol-3,20-dione 17-valerate 21-acetate.

C. 6,9(11)-bis-dehydro-pregnadiene intermediate.—To a solution of 1 g. of 6-chloro-16α-methyl-hydrocortisone 21-acetate in 5 ml. of distilled dimethylformamide and 5 ml. of anhydrous pyridine, add 0.5 ml. of methanesulfonyl chloride and heat the mixture at about 80° C. for one hour. Cool the solution, pour into ice water and filter the resultant precipitate. After drying the precipitate, dissolve it in acetone and treat the acetone solution with decolorizing carbon. Evaporate the pure acetone solution to a residue. Chromatograph on silica gel eluting with increasing amounts of ether-in-hexane. Combine the like fractions as determined by thin layer and spectroscopic data. Evaporate the combined eluates in vacuo to a residue comprising 6-chloro-16α-methyl-4,6,9(11)-pregnatriene-17α,21-diol-3,20-dione 21-acetate.

In a similar manner treat each of the following with methanesulfonyl chloride in dimethylformamide and pyridine.

(1) 6 - chloro-16α-methyl-6-dehydroprednisolone 21-acetate
(2) 6-dehydro-hydrocortisone 21-acetate and
(3) 6-dehydroprednisolone 21-acetate.

Isolated and purify the resultant respective products in a manner similar to that described above to obtain respectively, (1) 6-chloro-16α-methyl-1,4,6,9(11)-pregnatriene-17α,21-diol-3,20-dione 21-acetate
(2) 4,6,9(11)-pregnatriene-17α,21-diol-3,20-dione 21-acetate and
(3) 1,4,6,9(11)-pregnatetraene-17α,21-diol-3,20-dione 21-acetate.

D. 9(11) - dehydrotestosterone intermediates.—Utilizing known techniques, submit each of the following testosterone derivatives to the action of *Curvularia lunata* (N.R.R.L. 2380):

(1) 17α-methyltestosterone
(2) 17α-ethyltestosterone
(3) 17α-vinyltestosterone and
(4) 17α-ethinyltestosterone.

Isolate the resultant respective products according to known techniques to obtain respectively, (1) 11β-hydroxy-17α-methyltestosterone
(2) 11β-hydroxy-17α-ethyltestosterone
(3) 11β-hydroxy-17α-vinyltestosterone and
(4) 11β-hydroxy-17α-ethinyltestosterone.

Treat each of the foregaoing 11β-hydroxy compounds with methanesulfonyl chloride in pyridine and dimethylformamide in a manner similar to that described in above Example 17C to obtain respectively, (1) 17α-methyl-9(11)-dehydrotestosterone
(2) 17α-ethyl-9(11)-dehydrotestosterone
(3) 17α-vinyl-9(11)-dehydrotestosterone and
(4) 17α-ethinyl-9(11)-dehydrotestosterone.

E. 6 - chloro - 17α-acetoxy - 9(11) - dehydroprogesterones.—(1) 6α-chloro-17α-acetoxy-9(11)-dehydroprogesterone is obtained from 17α-acetoxy-9(11)-dehydroprogesterone by conversion thereof to the corresponding ethyl enol ether by treatment with ethyl orthtoformate in dioxane according to known techniques followed by treatment of the 3-ethoxy-17α-acetoxy-3,5,9(11)-pregnatriene-20-one thereby formed with N-chlorosuccinimide in acetone and aqueous acetic acid in the presence of sodium acetate to obtain 6β-chloro-17α-acetoxy-4,9(11)-pregnadiene-3,20-dione. Treatment of the foregoing 6β-chloro compound with acid in known manner yields 6α-chloro-17α - acetoxy-4,9(11)-pregnadiene-3,20-dione (6α-chloro-17α-acetoxy-9(11)-dehydroprogesterone).

(2) Heat at reflux temperature for 13 hours under an atmosphere of nitrogen, a mixture of 2 g. of 6α-methyl-16-methylene-17α-acetoxy-4,9(11)-pregnadiene-3,20-dione and 5 g. of chlorinil in 60 ml. of ethyl acetate and 15 ml. of acetic acid. Evaporate the reaction mixture to a residue and extract with ethyl acetate. Combine the organic extracts and wash with cold 1% aqueous sodium hydroxide, then with water and dry over magnesium sulfate. Filter and evaporate to a residue comprising 6-chloro-16-methylene-17α-acetoxy-4,6,9(11)-pregnatriene-3,20-dione (6 - chloro-16-methylene-17α-acetoxy-6,9,(11)-bis-dehydroprogesterone). Purify by crystallization from acetone-hexane.

In a similar manner treat 6α-chloro-17α-acetoxy-4,9(11)-pregnadiene-3,20-dione with chlorinil. Isolate and purify the resultant product in a similar manner to obtain 6-chloro-17α-acetoxy-4,6,9(11)-pregnatriene-3,20-dione (3) Stir a reflux temperature for 3 hours a mixture of 19.5 g. of 6α-chloro-16-methylene-17α-acetoxy-4,9(11)-pregnadiene-3,20-dione in 195 ml. of dioxane and 19.5 g. of dichlorodicyanobenzoquinone. Cool to room temperature, filter and dilute the filtrate with 2 liters of methylene chloride, wash the methylene chloride solution with 1% aqueous sodium hydroxide and then with water until the water extracts are neutral. Dry the methylene chloride solution over sodium sulfate, filter and evaporate in vacuo to a residue comprising 6α-chloro-16-methylene-17α-acetoxy-1,4,9(11)-pregnatriene-3,20-dione.

In a similar manner treat

6α-methyl-17α-acetoxy-4,9(11)-pregnadiene-3,20-dione,
6-chloro-16-methylene-17α-acetoxy-4,6,9(11)-pregnatriene-3,20-dione and
6-chloro-17α-acetoxy-4,6,9(11)-pregnatriene-3,20-dione with dichlorodicyanobenzoquinone to obtain respectively, (1) 6α-methyl-17α-acetoxy-1,4,9(11)-pregnatriene-3,20-dione
(2) 6-chloro-16-methylene-17α-acetoxy-1,4,6,9(11)-pregnatetraene-3,20-dione and (3) 6-chloro-17α-acetoxy-1,4,6,9(11)-pregnatetraene-3,20-dione.

EXAMPLE 18

9α-chloro-11β-azido-4-pregnene-17α,21-diol-3,20-diones and esters thereof

A. 9α-chloro - 11β-azido-16α-methyl-17α,21-diol-3,20-dione 17,21-dipropionate.—In a manner similar to that described in Example 1A, treat 16α-methyl-1,4,9(11)-pregnatriene-17α,21-diol-3,20-dione 17,21 - dipropionate with sodium azide in aqueous acetic acid followed by treatment with N-chlorosuccinimide. Isolate and purify the resultant product in a manner similar to that described to obtain 9α-chloro-11β-azido-16α - methyl - 1,4-pregnadiene-17α,21-diol-3,20-dione 17,21-dipropionate.

In a similar manner treat each of the following with sodium azide in aqueous acetic acid followed by N-chlorosuccinimide:

(1) 16α-methyl-1,4,9(11)-pregnatriene-17α,21-diol-3,20-dione 17,21-dipropionate
(2) 1,4,9(11)-pregnatriene-17α,21-diol-3,20-dione 17,21-dipropionate
(3) 16α-methyl-1,4,9(11)-pregnatriene-17α,21-diol-3,20-dione 17-valerate 21-acetate
(4) 16β-methyl-1,4,9(11)-pregnatriene-17α,21-diol-3,20-dione 17-valerate 21-acetate
(5) 1,4,9(11)-pregnatriene-17α,21-diol-3,20-dione 17-valerate 21-acetate
(6) 6-chloro-16α-methyl-4,6,9(11)-pregnatriene-17α,21-diol-3,20-dione 17-valerate 21-acetate
(7) 6-chloro-16α-methyl-1,4,6,9(11)-pregnatetraene-17α,21-diol-3,20-dione 21-acetate
(8) 6-chloro-4,6,9(11)-pregnatriene-17α,21-diol-3,20-dione 21-acetate and
(9) 6-chloro-1,4,6,9(11)-pregnatetraene-17α,21-diol-3,20-dione 21-acetate.

Isolate and purify the resultant respective products in a manner similar to that described above to obtain respectively, (1) 9α-chloro-11β-azido-16β-methyl-1,4-pregnadiene-17α,21-diol-3,20-dione 17,21-dipropionate
(2) 9α-chloro-11β-azido-1,4-pregnadiene-17α,21-diol-3,20-dione 17,21-dipropionate
(3) 9α-chloro-11β-azido-16α-methyl-1,4-pregnadiene-17α,21-diol-3,20-dione 17-valerate 21-acetate
(4) 9α-chloro-11β-azido-16β-methyl-1,4-pregnadiene-17α,21-diol-3,20-dione 17-valerate 21-acetate
(5) 9α-chloro-11β-azido-1,4-pregnadiene-17α,21-diol-3,20-dione 17-valerate 21-acetate
(6) 6,9α-dichloro-11β-azido-16α-methyl-4,6-pregnadiene-17α,21-diol-3,20-dione 17-valerate 21-acetate
(7) 6,9α-dichloro-11β-azido-16α-methyl-1,4,6-pregnatriene-17α,21-diol-3,20-dione 21-acetate
(8) 6,9α-dichloro-11β-azido-4,6-pregnadiene-17α,21-diol-3,20-dione 21-acetate and
(9) 6,9α-dichloro-11β-azido-1,4,6-pregnatriene-17α,21-diol-3,20-dione 21-acetate.

In the above procedure by substituting for N-chlorosuccinimide the reagent N-bromoacetamide and carrying out the reaction in a manner similar to that described in Example 15A, utilizing as starting compounds the 9(11)-dehydro steroids listed in the first and second paragraphs of this example, there is obtained the corresponding 9α-bromo-11β-azido-derivatives, i.e. 9α-bromo-11β-azido-16α-methyl-1,4-pregnadiene-17α,21-diol-3,20-dione 17,21-dipropionate and the 9α-bromo analogs of the 9α-chloro products listed in the third paragraph of this example, i.e.:

(1) 9α-bromo-11β-azido-16β-methyl-1,4-pregnadiene-17α,21-diol-3,20-dione 17,21-dipropionate
(2) 9α-bromo-11β-azido-1,4-pregnadiene-17α,21-diol-3,20-dione 17-,2-dipropionate
(3) 9α-bromo-11β-azido-16α-methyl-1,4-pregnadiene-17α,21-diol-3,20-dione 17-valerate 21-acetate
(4) 9α-bromo-11β-azido-16β-methyl-1,4-pregnadiene-17α,21-diol-3,20-dione 17-valerate 21-acetate
(5) 9α-bromo-11β-azido-1,4-pregnadiene-17α,21-diol-3,20-dione 17-valerate 21-acetate
(6) 6-chloro-9α-bromo-11β-azido-16α-methyl-4,6-pregnadiene-17α,21-diol-3,20-dione 17-valerate 21-acetate
(7) 6-chloro-9α-bromo-11β-azido-16α-methyl-1,4,6-pregnatriene-17α,21-diol-3,20-dione 21-acetate
(8) 6-chloro-9α-bromo-11β-azido-4,6-pregnadiene-17α,21-diol-3,20-dione 21-acetate and
(9) 6-chloro-9α-bromo-11β-azido-1,4,6-pregnatriene-17α,21-diol-3,20-dione 21-acetate.

B. 9α - chloro - 11β - azido - 16α-methyl-1,4-pregnadiene-17α,21-diol - 3,20 - dione 17 - propionate.—Add 1 g. of 9α-chloro-11β-azido-16α-methyl-1,4-pregnadiene-17α,21-diol-3,20-dione 17,21-dipropionate to a solution of 7 ml. of 70% aqueous perchloric acid in 68 ml. of methanol maintained at about 0° C. Stir the reaction mixture for about 48 hours, then pour into 700 ml. of cold water. Filter the resultant precipitate, air dry at 40° C. and purify by crystallization from acetone-hexane to obtain 9α-chloro - 11β - azido - 16α - methyl - 1,4 - pregnadiene-17α,21-diol-3,20-dione 17-propionate.

In a manner similar to that described above, treat each of the 9α - chloro-11β-azido-4-pregnene-17α,21-diol-3,20-dione 21-esters and the corresponding 9α-bromo-analogs prepared as described in Example 18A with 70% perchloric acid in methanol. Isolate and purify the resultant respective products in a manner similar to that described to obtain the corresponding 21-hydroxy compounds, i.e. respectively.

(1) 9α-chloro-11β-azido-16β-methyl-1,4-pregnadiene-17α,21-diol-3,20-dione 17-propionate
(2) 9α-chloro-11β-azido-1,4-pregnadiene-17α,21-diol-3,20-dione 17-propionate
(3) 9α-chloro-11β-azido-16α-methyl-1,4-pregnadiene-17α,21-diol-3,20-dione 17-valerate
(4) 9α-chloro-11β-azido-16β-methyl-1,4-pregnadiene-17α,21-diol-3,20-dione 17-valerate
(5) 9α-chloro-11β-azido-1,4-pregnadiene-17α,21-diol-3,20-dione 17-valerate
(6) 6,9α-dichloro-11β-azido-16α-methyl-4,6-pregnadiene-17α,21-diol-3,20-dione 17-valerate
(7) 6,9α-dichloro-11β-azido-16α-methyl-1,4,6-pregnatriene-17α,21-diol-3,20-dione
(8) 6,9α-dichloro-11β-azido-4,6-pregnadiene-17α,21-diol-3,20-dione and
(9) 6,9α-dichloro-11β-azido-1,4,6-pregnatriene-17α,21-diol-3,20-dione.

EXAMPLE 19

9α-chloro-11β-azido-progesterones and the corresponding 9α-bromo-11β-azido-derivatives In a manner similar to that described in Example 1A, treat each of the following 9(11)-dehydro-steroids with sodium azide in aqueous acetic acid followed by N-chlorosuccinimide:

(1) 6α-chloro-17α-acetoxy-4,9(11)-pregnadiene-3,20-dione
(2) 6-chloro-17α-acetoxy-4,6,9(11)-pregnatriene-3,20-dione
(3) 6-chloro-17α-acetoxy-1,4,6,9(11)-pregnatriene-3,20-dione
(4) 6α-chloro-17α-acetoxy-1,4,9(11)-pregnatriene-3,20-dione
(5) 6α-chloro-16-methylene-17α-acetoxy-1,4,9(11)-pregnatriene-3,20-dione
(6) 6-chloro-16-methylene-17α-acetoxy-1,4,6,9(11)-pregnatetraene-3,20-dione
(7) 6-chloro-16-methylene-17α-acetoxy-4,6,9(11)-pregnatriene-3,20-dione
(8) 4,9(11)-androstadiene-3,17-dione
(9) 17α-methyl-4,9(11)-androstadien-17β-ol-3-one

(10) 17α-methyl-4,9(11)-androstadien-17β-ol-3-one 17-propionate
(11) 17α-ethyl-4,9(11)-androstadien-17β-ol-3-one
(12) 17α-vinyl-4,9(11)-androstadien-17β-ol-3-one
(13) 4,9(11)-pregnadiene-3,20-dione
(14) 17α-acetoxy-4,9(11)-pregnadiene-3,20-dione
(15) 6α-fluoro-17α-acetoxy-4,9(11)-pregnadiene-3,20-dione.

Isolate and purify the resultant respective products in a manner similar to that described in Example 1A to obtain respectively, (1) 6α,9α-dichloro-11β-azido-17α-acetoxy-4-pregnene-3,20-dione
(2) 6,9α-dichloro-11β-azido-17α-acetoxy-4,6-pregnadiene-3,20-dione
(3) 6,9α-dichloro-11β-azido-17α-acetoxy-1,4,6-pregnatriene-3,20-dione
(4) 6α,9α-dichloro-11β-azido-17α-acetoxy-1,4-pregnadiene 3,20-dione
(5) 6α,9α-dichloro-11β-azido-16-methylene-17α-acetoxy-1,4-pregnadiene-3,20-dione
(6) 6,9α-dichloro-11β-azido-16-methylene-17α-acetoxy-1,4,6-pregnatriene-3,20-dione
(7) 6,9α-dichloro-11β-azido-16-methylene-17α-acetoxy-4,6-pregnadiene-3,20-dione
(8) 9α-chloro-11β-azido-4-androstene-3,17-dione
(9) 9α-chloro-11β-azido-17α-methyl-4-androstene-17β-ol-3-one
(10) 9α-chloro-11β-azido-17α-methyl-4-androsten-17β-ol-3-one 17-propionate
(11) 9α-chloro-11β-azido-17α-ethyl-4-androsten-17β-ol-3-one
(12) 9α-chloro-11β-azido-4-pregnene-3,20-dione
(13) 9α-chloro-11β-azido-17α-acetoxy-4-pregnene-3,20-dione and
(14) 6α-fluoro-α-chloro-11β-azido-17α-acetoxy-4-pregnene-3,20-dione.

B. Treat each of the 9(11)-dehydro steroid starting compounds listed in Example 19A with sodium azide in aqueous acetic acid followed by N-bromoacetamide in a manner similar to that described in Example 15A. Isolate and purify the resultant respective products to obtain respectively:

(1) 6α-chloro-9α-bromo-11β-azido-17α-acetoxy-4-pregnene-3,20-dione
(2) 6-chloro-9α-bromo-11β-azido-17α-acetoxy-4,6-pregnadiene-3,20-dione
(3) 6-chloro-9α-bromo-11β-azido-17α-acetoxy-1,4,6-pregnatriene-3,20-dione
(4) 6α-chloro-9α-bromo-11β-azido-17α-acetoxy-1,4-pregnadiene-3,20-dione
(5) 6α-chloro-9α-bromo-11β-azido-16-methylene-17α-acetoxy-1,4-pregnadiene-3,20-dione
(6) 6-chloro-9α-bromo-11β-azido-16-methylene-17α-acetoxy-1,4,6-pregnatriene-3,20-dione
(7) 6-chloro-9α-bromo-11β-azido-16-methylene-17α-acetoxy-4,6-pregnadiene-3,20-dione
(8) 9α-bromo-11β-azido-4-androstene-3,17-dione
(9) 9α-bromo-11β-azido-17α-methyl-4-androsten-17β-ol-3-one
(10) 9α-bromo-11β-azido-17α-methyl-4-androsten-17β-ol-3-one 17-propionate
(11) 9α-bromo-11β-azido-17α-ethyl-4-androsten-17-ol-3-one
(12) 9α-bromo-11β-azido-4-pregnene-3,20-dione
(13) 9α-bromo-11β-azido-17α-acetoxy-4-pregnene-3,20-dione and
(14) 6α-fluoro-9α-bromo-11β-azido-17α-acetoxy-4-pregnene-3,20-dione.

EXAMPLE 20

9α - bromo - 11β - azido - 4 - pregnene - 17α,21 - diol - 3, 20-dione (prepared via the replacement of the 11β-tosyloxy group (azido))

A. 9α-bromo-11β-tosyloxy-16α-methyl-1,4-pregnadiene-17α,21-diol-3,20-dione 21-phosphate.—Treat 16α-methyl-1,4,9(11)-pregnatriene - 17α,21 - diol-3,20-dione 21-phosphate (the product of Example 3C) in a manner similar to that described in Example 3D by utilizing in place of N-chlorosuccinimide the reagent N-bromoacetamide. Isolate and purify the resultant product in a manner similar to that described in Example 3D to obtain 9α-bromo-11β-tosyloxy - 16α - methyl - 1,4 - pregnadiene - 17α,21 - diol-3,20-dione 21-phosphate.

Similarly, 6-chloro-4,6,9(11)-pregnatriene-17α,21-diol-3,20-dione 21-phosphate (prepared from the corresponding 21-hydroxy compound in the manner of Examples 3A–3C), and 6-chloro-1,4,6,9(11)-pregnatetraene-17α,21-diol - 3,20 - dione  21 - phosphate, when reacted with p-toluenesulfonic acid and N-bromoacetamide in the manner of Example 20A, there is obtained 6-chloro-9α-bromo-11β - tosyloxy - 4,6 - pregnadiene - 17α,21 - diol - 3,20-dione 21-phosphate and 6-chloro-9α-bromo-11β-tosyloxy-1,4,6-pregnatriene-17α,21-diol-3,20-dione 21-phosphate.

B. 9α-bromo-11β-azido-16α - methyl - 1,4 - pregnadiene-17α,21-diol-3,20-dione 21-phosphate.—In a manner similar to that described in Example 4A, treat 9α-bromo-11β-tosyloxy - 16α - methyl - 1,4 - pregnadiene - 17α,21 - diol-3,20-dione 21-phosphate with sodium azide in water. Isolate and purify the resultant product in a manner similar to that described to obtain 9α-bromo-11β-azido-16α-methyl - 1,4 - pregnadiene - 17α,21 - diol - 3,20 - dione 21-phosphate.

Similarly, treat 6-chloro-9α-bromo-11β-tosyloxy-4,6-pregnadiene-17α,21-diol-3,20-dione 21-phosphate and 6-chloro - 9α - bromo - 11β - tosyloxy - 1,4,6 - pregnatriene-17α,21-diol-3,20-dione 21-phosphate with sodium azide in water to obtain respectively, (1) 6-chloro-9α-bromo-11β-azido-4,6-pregnadiene-17α,21-diol-3,20-dione 21-phosphate and
(2) 6-chloro-9α-bromo-11β-azido-1,4,6-pregnatriene-17α,21-diol-3,20-dione 21-phosphate.

C. 9α-bromo-11β-azido-16α - methyl - 1,4 - pregnadiene-17α,21-diol-3,20-dione.—In a manner similar to that described in Example 4B, treat each of the 21-phosphate products prepared in Example 20B with bacterial alkaline phosphatase. Isolate and purify the resultant respect products in a manner similar to that described to obtain respectively, (1) 9α-bromo-11β-azido-16α-methyl-1,4-pregnadiene-17α,21-diol 3,20-dione
(2) 6-chloro-9α-bromo-11β-azido-4,6-pregnadiene-17α,21-diol-3,20-dione and
(3) 6-chloro-9α-bromo-11β-azido-1,4,6-pregnatriene-17α,21-diol-3,20-dione.

EXAMPLE 21

6,9α-dichloro-11β-azido-4,6-pregnadienes prepared by the replacement of the 11-tosyloxy group by azido In a manner similar to that described in Examples 3D and 4A and 4B, treat each of 6-chloro-4,6,9(11)-pregnatriene-17α,21-diol-3,20-dione 21-phosphate and the 1-dehydro analog thereof with p-toluenesulfonic acid and N-chlorosuccinimide to obtain respectively 6,9α-dichloro-11β - tosyloxy - 4,6 - pregnadiene - 17α,21 - diol - 3,20-dione 21-phosphate and the 1-dehydro analog thereof followed by treatment of the foregoing 11β-tosyloxy products with sodium azide in water to obtain respectively, 6,9α - dichloro - 11β - azido - 4,6 - pregnadiene - 17α,21-diol-3,20-dione 21-phosphate and 6,9α-dichloro-11β-azido-1,4,6-pregnatriene-17α,21-diol-3,20-dione 21-phosphate.

Treatment of the foregoing 21-phosphate esters with bacterial alkaline phosphatase yields the corresponding 21 hydroxy compounds, namely 6,9α-dichloro-11β-azido-4,6-pregnadiene-17α,21-diol-3,20-dione and 6,9α-dichloro - 11α - azido - 1,4,6 - pregnatriene - 17α,21 - diol-3,20-dione.

We claim:

1. A compound selected from the group consisting of 9α-halogeno-11β-azido-steroids of the following structural formula, and the 1-dehydro-, 6-dehydro-, and 1,6-bisdehydro-analogs thereof:

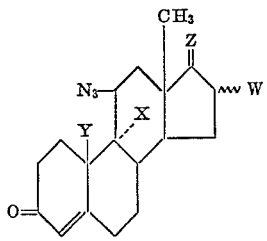

wherein:

X is a halogen having an atomic weight greater than 20 and less than 100;
Y is a member selected from the group consisting of hydrogen and methyl;
W is a member selected from the group consisting of hydrogen, lower alkyl, and lower alkylidene; and
Z is a member selected from the group consisting of oxygen, $$\diagdown\!\!\!\substack{OR\\ ---A}$$

and $$\diagdown\!\!\!\substack{COCH_2V\\ ---T}$$

A being a member selected from the group consisting of hydrogen, lower alkyl, and lower alkinyl; R being a member selected from the group consisting of hydrogen and lower alkanoyl; T being a member selected from the group consisting of hydrogen, hydroxy, and lower alkanoyloxy; and V being a member selected from the group consisting of hydrogen, fluorine, hydroxy, lower alkanoyloxy, lower alkoxycarboxy, and dihydroxyphosphoryloxy.

2. A 1-dehydro compound according to claim 1, wherein X is a halogen having an atomic weight greater than 20 and less than 100, Y is methyl, W is hydrogen and lower alkyl, and Z is $$\diagdown\!\!\!\substack{CH_2VCO\\ ---T}$$

T being a member selected from the group consisting of hydroxy and lower alkanoyloxy; and V being a member selected from the group consisting of hydroxy, lower alkanoyloxy, ethoxycarboxy and dihydroxyphosphoryloxy;

said compound being a member selected from the group consisting of 9α-X-11β-azido-1,4-pregnadiene-17α,21-diol-3,20-dione and the 16-methyl analogs thereof, and their 17-lower alkanoate, 21-lower alkanoate, 17,21-dilower alkanoate, 21-carboethoxylate, and the 21-phosphate esters.

3. 9α - chloro - 11β - azido - 16α - methyl - 1,4-pregnadiene-17α,21-diol-3,20-dione.

4. 9α - chloro - 11β - azido - 16α - methyl - 1,4-pregnadiene-17α,21-diol-3,20-dione 21-acetate.

5. 9α - chloro - 11β - azido - 16β - methyl - 1,4-pregnadiene-17α,21-diol-3,20-dione.

6. 9α - chloro - 11β - azido - 16 - methyl-1,4-pregnadiene-17α,21-diol-3,20-dione 21-phosphate.

7. 9α - chloro - 11β - azido - 16 - methyl-1,4-pregnadiene-17α,21-diol-3,20-dione 17,21-dipropionate.

8. 9α - chloro - 11β - azido - 16 - methyl-1,4-pregnadiene-17α,21-diol-3,20-dione 17-valerate.

9. In the process for preparing a compound according to claim 1, the step which comprises treating a 9(11)-dehydro steriod selected from the group consisting of a 9(11)-dehydroandrostane and a 9(11)-dehydropregnane with an alkali metal azide and a halogenating agent selected from the group consisting of a positive chlorine donor and a positive bromine donor.

10. The process according to claim 9 wherein said alkali metal azide is sodium azide.

11. The process according to claim 9 when carried out in aqueous lower alkanoic acid.

12. The process according to claim 9 when carried out in aqueous lower alkanoic acid and wherein said alkali metal azide is sodium azide, and said halogenating agen is N-chlorosuccinimide.

13. The process according to claim 9 when carried out in aqueous lower alkanoic acid and wherein said alkali metal azide is sodium azide, said halogenating agent is N-bromacetamide.

14. The proces according to claim 9 when carried out in aqueous acetic acid and wherein said 9(11)-dehydro steroid is 16α - methyl-1,4,9(11)-pregnatriene-17α,21-diol-3,20-dione 21-acetate, and said alkali metal azide is sodium azide, said halogenating reagent is N-chlorosuccinimide.

15. The process according to claim 14 including the step of isolating the 9α-chloro-11β-azido-16α-methyl-1,4-pregnadiene-17α,21-diol-3,20-dione 21 - acetate thereby formed.

No references cited.

ELBERT L. ROBERTS, Primary Examiner

U.S. Cl. X.R.

195—51; 260—397.3, 397.45, 999

PO-1050
(5/69)

UNITED STATES PATENT OFFICE
CERTIFICATE OF CORRECTION

Patent No. 3,455,968　　　　　Dated July 15, 1969

Inventor(s)　Hershel L. Herzog and Elliot L. Shapiro

It is certified that error appears in the above-identified patent and that said Letters Patent are hereby corrected as shown below:

Column 1, line 32, "to process for" should read ---to processes for---. Column 7, line 32, "of 9α-halogeno-" should read ---a 9α-halogeno- ---. Column 7, lines 67 and 68, the phrase "at C-11 an azide" should read ---at C-11 with an azide---. Column 8, line 36, the second and third words "the dilute" should read ---then dilute---. Column 8, line 52, the second word "and" should read ---the---. Column 8, line 52, the phrase "is determined" should read ---as determined---. Column 8, line "-17α,21-diol 3,20-dione" should read --- -17α,21-diol-3,20-dione. Column 10, line 11, "3,30-dione" should read ---3,20-dione---. Column 12, line 69, "β-tosyloxy" should read ---11β-tosyloxy---. Column 13, line 25, "21-fethanesulfonate" should read ---21-methanesulfonate---. Column 14, lines 40 and 41, delete the second occurrence of product (4), i.e. "(4) 2α-methyl-9α-chloro-11β-azido-4-pregnene-17α,21-diol-3,20-dione 21-phosphate". Column 15, line 40, "4,9(1)-pregnadiene" should read ---4,9(11)-pregnadiene---. Column 19, line 62, the first word "Isolated" should read ---Isolate---. Column 20, line 32, "norr 5α" should read ---nor-5α- ---. Column 22, line 33, in the compound name replace "19-nor" with ---16β-methyl---. Column 22, line 60, "pregnadient" should read ---pregnadiene---. Column 22, line 72 "14-pregnene" should read ---4-pregnene---. Column 24, line 37, "6α,7α-" should read ---6α,17α---. Column 25, line 45, "16α-1,4-" should read ---16α-methyl-1,4- ---. Column 26, line 36, "3,20-dione-17,21-dipropionate" should read ---3,20-dione 17,21-dipropionate---. Column 27, line 16, "dion" should read ---dione---. Column 27, line 64, "Isolated" should read ---Isolate---. Column 27, line 68, "1,4,6,9(11)-pregnatriene" should read ---1,4,6,9(11)-pregnatetraene---. Column 28, line 5 "Stir a" should read ---Stir at---. Column 29, line 73, "17-,2-dipropionate" should read ---17,21-dipropionate---. Column 30, line 64, "1,4,6,9(11)-pregnatriene" should read ---1,4,6,9(11)-pregnatetraene---. Column 31, line 36, "α-chloro" should read ---9α-chloro---. Claim 2, column 33, lines 48 and 49, the formula therein should appear as follows:　COCH₂V
　　　　　　　　　　　　　　　　　　　　　　　　　　　　　　　　　　　　　＜---T

SIGNED AND
SEALED

APR 28 1970

(SEAL)
Attest:

Edward M. Fletcher, Jr.
Attesting Officer

WILLIAM E. SCHUYLER, JR.
Commissioner of Patents